US007647577B2

(12) United States Patent
Wang et al.

(10) Patent No.: US 7,647,577 B2
(45) Date of Patent: *Jan. 12, 2010

(54) EDITING, CREATING, AND VERIFYING REORGANIZATION OF FLOWCHART, AND TRANSFORMING BETWEEN FLOWCHART AND TREE DIAGRAM

(75) Inventors: Jian Wang, Beijing (CN); Jun Zhu, Beijing (CN); Sheng Ye, Beijing (CN); Jing Li, Beijing (CN); Hai Qi Liang, ShangDi Beijing (CN); Ying Liu, Beijing (CN); Ying Nan Zuo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 785 days.

This patent is subject to a terminal disclaimer.

(21) Appl. No.: 11/140,194

(22) Filed: May 27, 2005

(65) Prior Publication Data
US 2005/0289526 A1 Dec. 29, 2005

(30) Foreign Application Priority Data
May 31, 2004 (CN) .................. 2004 1 0046116

(51) Int. Cl.
G06F 9/44 (2006.01)
G06F 9/45 (2006.01)
(52) U.S. Cl. .................. 717/105; 717/104; 717/113; 717/144; 717/156; 717/160
(58) Field of Classification Search .................. 717/105
See application file for complete search history.

(56) References Cited
U.S. PATENT DOCUMENTS 4,852,047 A * 7/1989 Lavallee et al. ............... 700/86
5,319,707 A  6/1994 Wasilewski et al. ........... 380/14
5,386,508 A * 1/1995 Itonori et al. ............... 717/109
5,669,001 A * 9/1997 Moreno ...................... 717/149
5,697,788 A * 12/1997 Ohta .......................... 434/118
6,594,783 B1 * 7/2003 Dollin et al. ................. 714/38
7,168,077 B2 * 1/2007 Kim et al. .................... 718/106
7,310,784 B1 * 12/2007 Gottlieb et al. .............. 715/853

(Continued)

FOREIGN PATENT DOCUMENTS
WO WO00/77972 A1 12/2000

*Primary Examiner*—Lewis A Bullock, Jr.
*Assistant Examiner*—Hang Pan
(74) *Attorney, Agent, or Firm*—Michael J. Buchenhorner; Vazken Alexanian; Louis P. Herzberg

(57) ABSTRACT

Provides methods for transforming a flowchart to an equivalent tree diagram, methods for transforming an equivalent tree diagram to a flowchart, methods for verifying reorganization of a flowchart, methods for editing a flowchart, methods for creating a flowchart and a flowchart editor. A flowchart includes one or more logic structures and one or more processing activities in said one or more logic structures. The method for transforming a flowchart to an equivalent tree diagram comprises: traversing said flowchart; transforming said one or more logic structures in said flowchart to one or more branching nodes in said tree diagram; and transforming one or more processing activities in said logic structures of said flowchart to one or more leaf nodes below corresponding branching nodes in said tree diagram. Further, edition of a flowchart and verification of reorganization of a flowchart are performed by utilizing an equivalent tree diagram.

5 Claims, 23 Drawing Sheets

U.S. PATENT DOCUMENTS 7,437,664 B2 * 10/2008 Borson .................. 715/234
2001/0053221 A1 12/2001 Takeda
2002/0095666 A1 * 7/2002 Tabata et al. ............. 717/149

* cited by examiner beginning or end of a flow direction of a flow input or output operation processing activity to be carried out decision to be made

EDITING, CREATING, AND VERIFYING REORGANIZATION OF FLOWCHART, AND TRANSFORMING BETWEEN FLOWCHART AND TREE DIAGRAM

TECHNICAL FIELD OF THE INVENTION

The present invention relates to computer data processing technology, specifically, to methods and apparatus for transforming between flowchart and equivalent tree diagram, creating and editing a flowchart; and to methods and apparatus for verifying the validity of flowchart reorganization.

BACKGROUND OF THE INVENTION

Flowcharts are widely used in fields of analyzing business flow, designing computer program, developing and managing data processing system, etc. As well known, a flowchart is a formalized graphic representation of a program logic sequence, work process, organization structure, etc. Traditional flowchart comprises a set of simple geometric symbols representing the beginning or end of a process, intermediate steps, decisions, I/O processes and directional lines connecting these symbols. The meanings of these geometric symbols have been clearly defined in industrial standards, such as ANSIx3.5, ISO 5807:1985, etc. FIG. 1 shows several common geometric symbols and their meanings in traditional flowchart.

At present, there are many computer software or hardware tools for designing, editing a flowchart, e.g., Holosofx™, Rational Rose™, CA™ process modeler, Sybase™ Power Designer, Enterprise Architect, etc. These tools can help business executives, business analyzers and commercial consultants get familiar with business flow, analyze business flow, and can also help system analyzers or program designers in designing and editing various flowcharts, some of these tools can generate various project documents or even source program code automatically. Due to the use of these tools, it has dramatically reduced system analyzer or program designer's workload.

However, for existing tools (technology) of designing and editing a flowchart, once finished flowchart design, it's hard to make modification or reorganization.

Consider the following scenarios. FIG. 2A is a simple illustrative flowchart edited by Rational Rose™. As shown in FIG. 2A, activities 2 and 3 are performed in parallel with activities 4 and 5. If we want to modify the execution mode of the four activities from parallel to sequential, as shown in FIG. 2B, then you need to perform following six operations: 1) delete the first synchronization bar; 2) delete the second synchronization bar; 3) add a flow from Activity 1 to Activity 2; 4) add a flow from Activity 3 to Activity 4; 5) add a flow from Activity 5 to Activity 6; 6) re-layout all of these graphic symbols.

If we want to change the synchronization (parallel) logic in FIG. 2A to decision logic, as shown in FIG. 2C, then we need to perform following nine operations: 1) delete the first synchronization bar; 2) delete the second synchronization bar; 3) add a condition box at the place of the first synchronization bar; 4) add a flow from Activity 1 to the condition box; 5) add a flow from the condition box to Activity 2; 6) add a flow from the condition box to Activity 4; 7) add a flow from Activity 3 to Activity 6; 8) add a flow from Activity 5 to Activity 6; 9) re-layout all of these graphic symbols.

Further, if we want to move Activity 3 in FIG. 2A to a place after synchronization (parallel) logic, as shown in FIG. 2D, then we need to perform following five operations: 1) reconnect the control flow between Activity 3 and the second synchronization bar to point to Activity 6; 2) reconnect the control flow between Activity 2 and Activity 3 from the second synchronization bar to Activity 3; 3) delete the control flow between the second synchronization bar and Activity 6; 4) add a control flow from Activity 2 to the second synchronization bar; 5) re-layout all of these graphic symbols. From the above examples we can see that it's very inconvenient to modify a flowchart using prior flowchart editing techniques, especially for complex flowcharts and when the flowcharts need to be changed often. For this reason, system analyzer and program designers waste a great deal of time and energy in those trivial editing operations.

SUMMARY OF THE INVENTION

In order to solve the above mentioned problems, the present invention provides systems, methods and apparatus to transform a flowchart to an equivalent tree diagram (equivalent tree), and then to edit, and/or reorganize the flowchart by utilizing the equivalent tree diagram.

According to one aspect of the present invention, there is provided a method for transforming a flowchart to an equivalent tree diagram, said flowchart comprises one or more logic structures and one or more processing activities in said one or more logic structures, said method comprises: traversing said flowchart; transforming said one or more logic structures in said flowchart to one or more branching nodes in said tree diagram; and transforming one or more processing activities in said logic structures of said flowchart to one or more leaf nodes below corresponding branching nodes in said tree diagram.

According to another aspect of the present invention, there is provided a method for transforming an equivalent tree diagram to a flowchart, characterized in that said equivalent tree diagram comprises one or more branching nodes that represent logic structure and leaf nodes that represent processing activities below said one or more branching nodes.

According to another aspect of the present invention, there is provided a method for verifying reorganizing of a flowchart.

According to another aspect of the present invention, there is provided a method for editing a flowchart.

According to another aspect of the present invention, there is provided a method for editing a flowchart.

According to another aspect of the present invention, there is provided a method for creating a flowchart by creating a tree diagram based on tasks to be modeled.

BRIEF DESCRIPTION OF THE DRAWINGS

The features, advantages and objectives of the present invention will be better understood from the following description of the preferable embodiments with reference to accompany drawings, in which.

DETAILED DESCRIPTION OF THE INVENTION

Figure 1:
FIG. 1 shows commonly used geometric graphics and their meanings in traditional flowcharts.
Figure 1:
Figure 1:
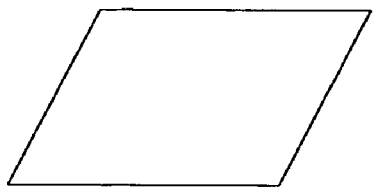
Figure 1:
Figure 1:
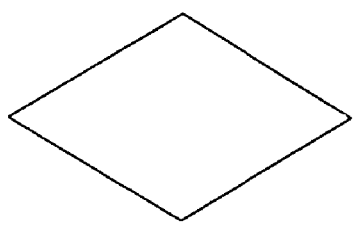
Figure 2A:
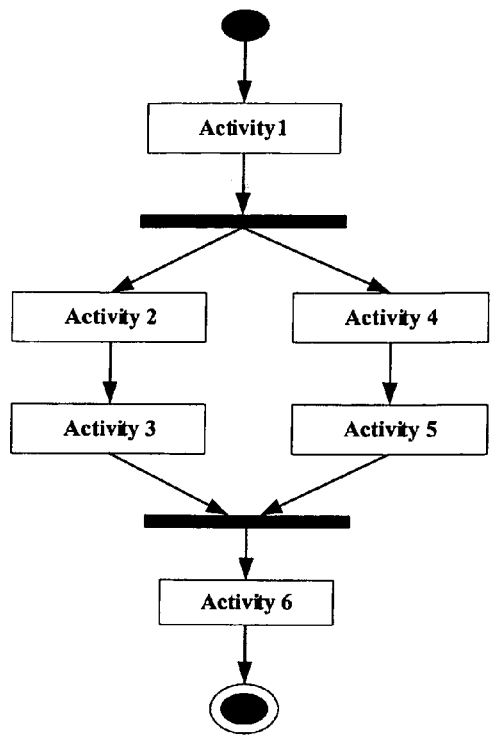
FIGS. 2A-2D are examples that use conventional method to edit flowchart.
Figure 2B:
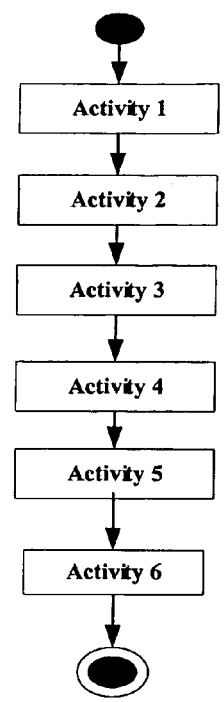
Figure 2C:
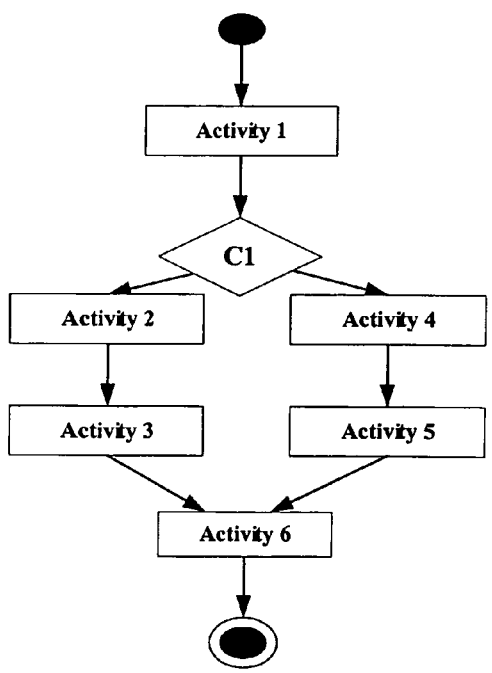
Figure 2D:
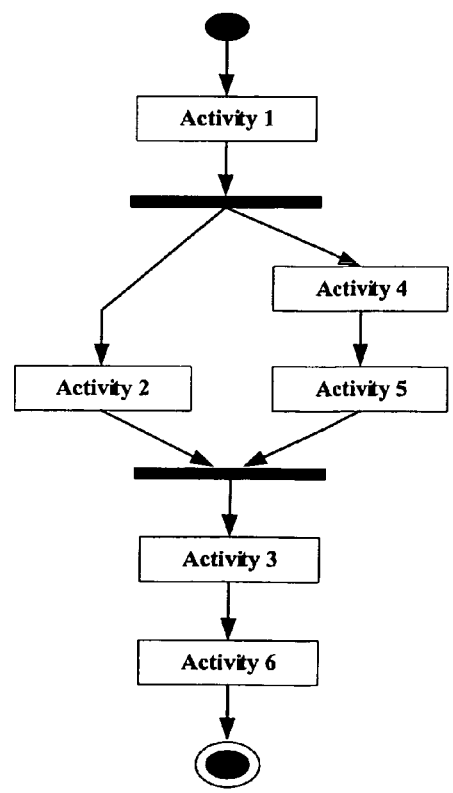

The present invention provides methods, systems and apparatus to transform a flowchart to an equivalent tree diagram (equivalent tree), and then to edit and/or reorganize the flowchart by utilizing the tree diagram which is equivalent to the flowchart. In an example embodiment there is provided a method for transforming a flowchart to an equivalent tree diagram, said flowchart comprises one or more logic structures and one or more processing activities in said one or more logic structures, said method comprises: traversing said flowchart; transforming said one or more logic structures in said flowchart to one or more branching nodes in said tree diagram; and transforming one or more processing activities in said logic structures of said flowchart to one or more leaf nodes below corresponding branching nodes in said tree diagram.

The present invention also provides a method for transforming an equivalent tree diagram to a flowchart, characterized in that said equivalent tree diagram comprises one or more branching nodes that represent logic structure and leaf nodes that represent processing activities below said one or more branching nodes, said method comprises: traversing said equivalent tree diagram; transforming said one or more branching nodes in said tree diagram to one or more logic structures in said flowchart; and transforming said one or more leaf nodes below said branching nodes in said tree diagram to one or more processing activities in corresponding logic structures in said flowchart.

There is further provided a method for verifying reorganizing of a flowchart, one or more nodes in the flowchart are selected for reorganizing, characterized in that said method comprises: transforming said flowchart to an equivalent tree diagram by utilizing said method for transforming a flowchart to an equivalent tree diagram; if said selected one or more nodes correspond to a sub tree in said equivalent tree diagram, or if said selected one or more nodes correspond to a plurality of sub trees in said equivalent tree diagram and said plurality of sub trees have a same parent node in common, then determining that the reorganization of flowchart is valid, otherwise invalid.

The present invention also provides a method for editing a flowchart, characterized in that, said method comprises: generating an equivalent tree diagram based on said flowchart by utilizing said method for transforming a flowchart to an equivalent tree diagram; modifying said generated equivalent tree diagram; and transforming said equivalent tree diagram to a flowchart by utilizing said method for transforming an equivalent tree diagram to a flowchart.

The present invention also provides a method for editing a flowchart, characterized in that, said method comprises: generating an equivalent tree diagram based on said flowchart by utilizing said method for transforming a flowchart to an equivalent tree diagram; selecting one or more nodes in said flowchart for modification; if said selected one or more nodes correspond to a sub tree in said equivalent tree diagram, or said selected one or more nodes correspond to a plurality of sub trees in said equivalent tree diagram and said plurality of sub trees have a same parent nodes in common, then permitting the modification, otherwise the modification is not permitted; if permitted, then making a corresponding modification in said generated equivalent tree diagram; and transforming said equivalent tree diagram to a flowchart by utilizing said method for transforming an equivalent tree diagram to a flowchart.

The present invention also provides a method for creating a flowchart, comprising: creating a tree diagram based on tasks to be modeled, wherein a branching node in said tree diagram represents a logic structure and a leaf node in said tree diagram represents a processing activity; and transforming said equivalent tree diagram to a flowchart by utilizing said method for transforming an equivalent tree diagram to a flowchart.

Next, various preferred embodiments of the present invention will be described in detail in conjunction with the accompany drawings. As mentioned above, a flowchart is hard to modify and edit due to its nature characteristics. But a tree diagram, as well known, is very convenient to edit and modify, and it is very suitable for representing semantic concept structure due to its nature characteristics. Thus, if we can transform a flowchart equivalently (without losing semantic meanings) to a tree diagram, then we can utilize the advantages of both flowchart and tree diagram and overcome respective disadvantages, such as, editing, reorganizing a flowchart or verifying reorganization operations etc.

Method for Transforming a Flowchart to an Equivalent Tree Diagram

According to one aspect of the present invention, there is provided a method for transforming a flowchart to an equivalent tree diagram. The method will be described in the following in conjunction with the accompany drawings.

In order to transform a flowchart to an equivalent tree diagram, first we need to represent respective semantic elements of the flowchart in the tree diagram in a proper manner. Next we will gradually analyze respective semantic elements in the flowchart and explain rules for corresponding to elements in the equivalent tree diagram.

Figure 3A:
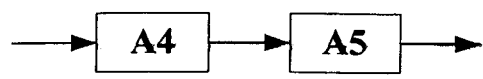
FIGS. 3A-3J show how to represent various logic structures in a flowchart as corresponding branching nodes in a tree diagram.
Figure 3B:
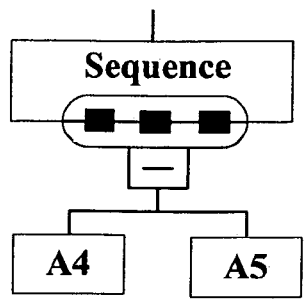

There are two kinds of semantic elements in a flowchart: processing activity and logic structure. Processing activity is a basic component in a flowchart; it is a specific activity unit in a flow and is generally represented by a rectangle, such as Activities 1-6 in FIG. 2. According to one embodiment of the present invention, in the equivalent tree diagram, a leaf node is used to represent a processing activity. Logic structure is the basic flow logic of respective processing activities in a flowchart, including: sequence logic structure, split logic structure and loop logic structure. According to one embodiment of the present invention, in an equivalent tree diagram, branching nodes are used to represent logic structures. FIGS. 3A-3J show respectively the manner in which various logic structures are represented in an equivalent tree diagram, next they will be explained one by one:

(1) Sequence logic structure, represents the semantic of sequentially performing one or more processing activities. As shown in FIG. 3A, A4 and A5 are two processing activities in a sequence logic structure. A sequence logic structure is represented as a branching node of sequence logic structure type in the equivalent tree diagram, as shown in FIG. 3B, wherein the branching node of sequence logic structure type has two leaf nodes A4 and A5.

(2) Split logic structure, represents the semantic of splitting a flow into multiple directions, it includes three types, i.e. AND, OR and XOR. As well known in the art, AND split logic structure represents that each split should be executed, XOR split logic structure represents that only one of the splits need to be executed, and OR split logic structure represents that one or more splits in all splits may be executed.

Figure 3C:
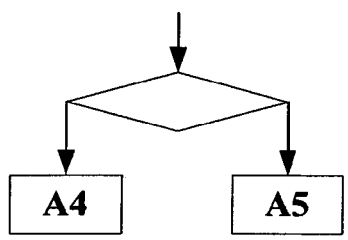
Figure 3D:
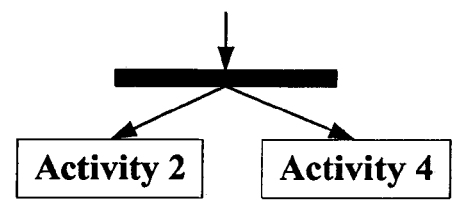
Figure 3E:
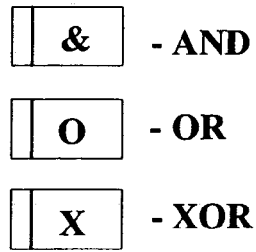
Figure 3F:
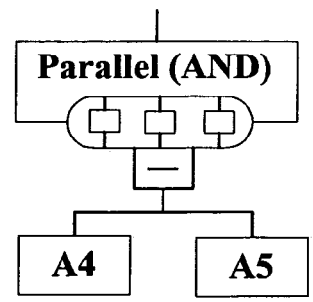

In a normalized flowchart, each split logic structure should have a split and a join that identify the beginning and the end of the split logic structure respectively. According to different industrial standards, the types of split logic structure may vary. For example, early flowcharts only support XOR split logic structure which is represented as condition box, as shown in FIG. 3C. UML activity diagram supports both AND split logic structure and XOR split logic structure which is represented as condition box in FIG. 3C and synchronization bar in FIG. 3D respectively. IDEF3 can support all of the three types of split logic structure, as shown in FIG. 3E. In an equivalent tree diagram, split logic structures are represented as branching nodes of the three types of split logic structure respectively, that is, "Parallel(AND)", "Parallel(OR)" and "Parallel(XOR)", as shown in FIG. 3F.

Figure 3G:
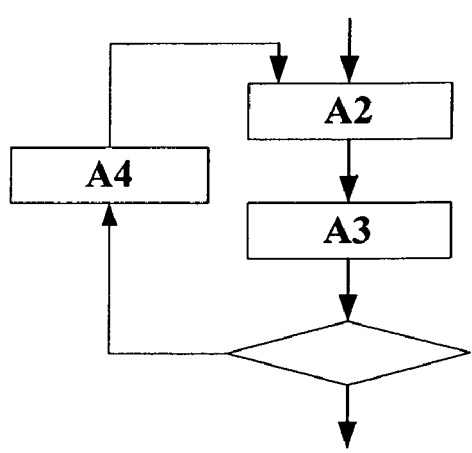
Figure 3H:
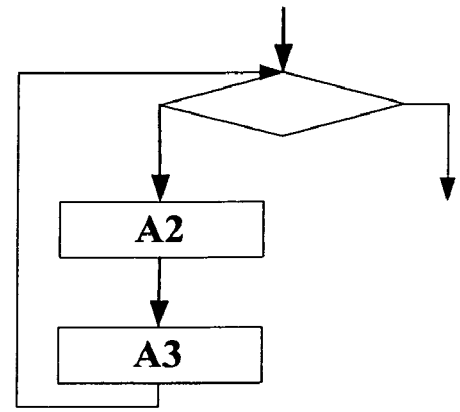
Figure 3I:
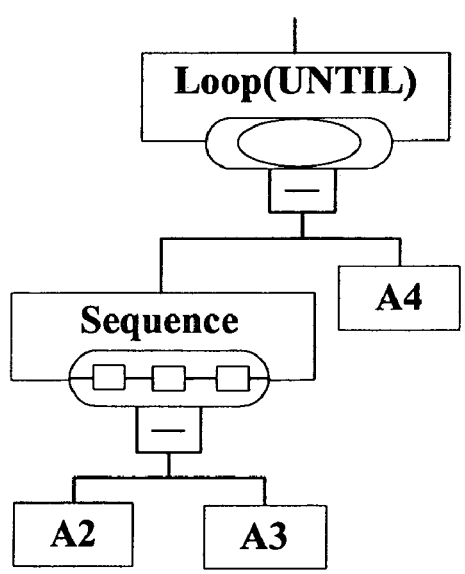
Figure 3J:
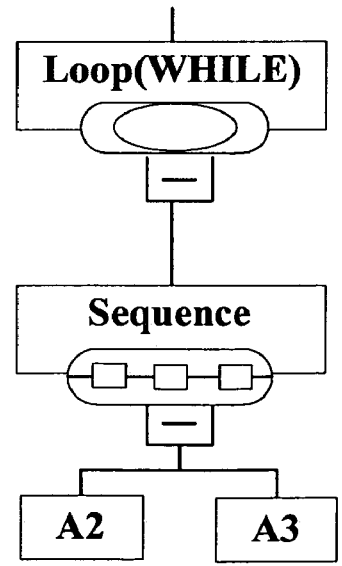

(3) Loop logic structure, represents the semantic of flow cycle, it generally includes two types: UNTIL and WHILE, as shown in FIG. 3G and FIG. 3H respectively. In an equivalent tree diagram, loop logic structures are represented as branching nodes of the two types of loop logic structure respectively, that is, Loop(UNTIL) and Loop(WHILE), as shown in FIG. 3I and FIG. 3J. And the first node below s branching node of loop logic structure type represents the Loop-body executed in the loop, the second node represents the Back-body executed when returning to the loop.

According to one embodiment of the present invention, each branching node in the equivalent tree diagram has three attributes: node ID, which uniquely identifies that node; node type, which represents the logic structure type the node stands for; condition data, which records condition and switch information of the logic structure the branching node stands for, such as, judgment condition for XOR split logic structure, loop condition or exit loop condition for loop logic structure, etc. In addition, each leaf node in the equivalent tree diagram has at least two attributes: node ID, which uniquely identifies that node; activity data, which records information of the processing activity the node stands for.

Figure 4A:
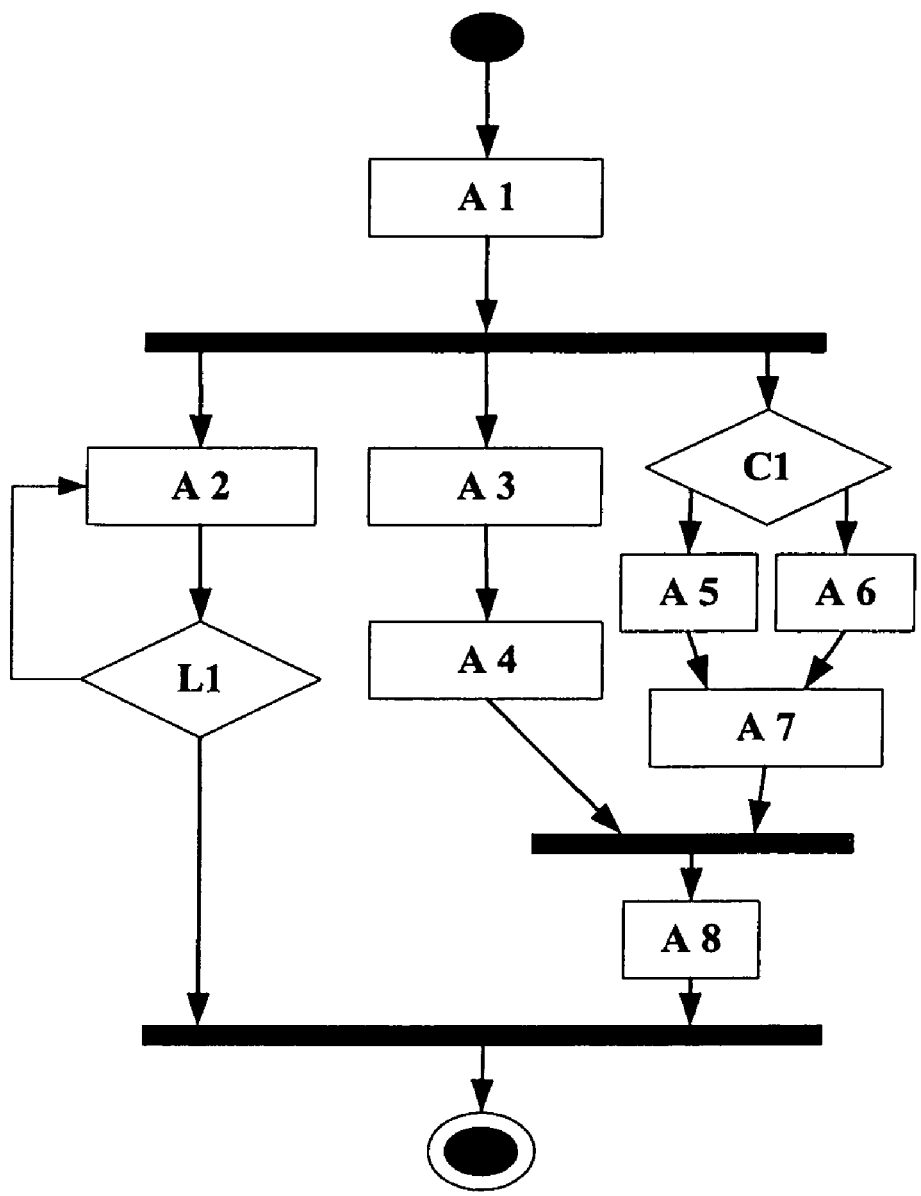
FIG. 4A shows an illustrative flowchart to be transformed.
Figure 4B:
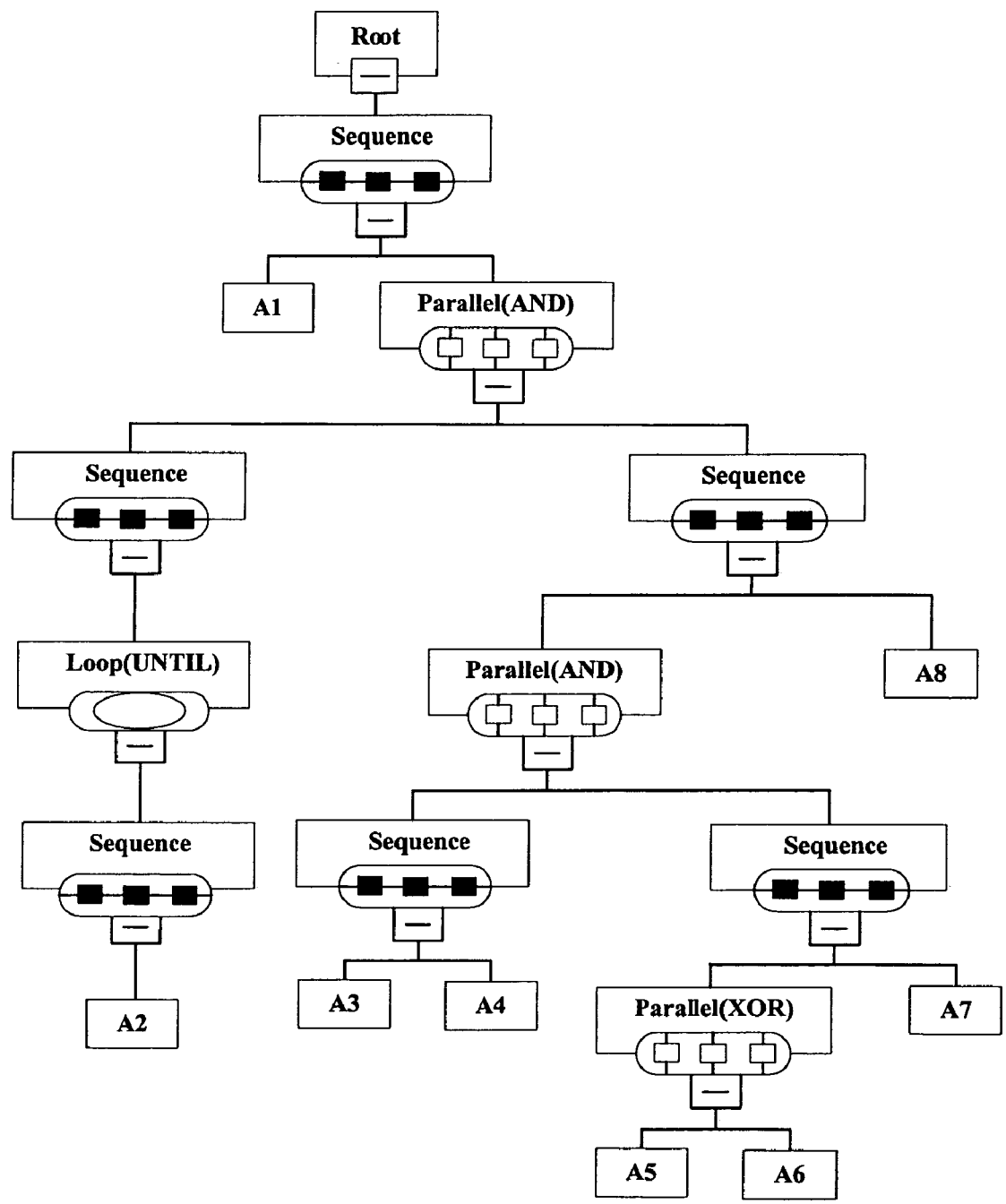
FIG. 4B shows the transformed tree diagram which is equivalent to the flowchart.

According to the above described transformation rules, the flowchart shown in FIG. 4A can be transformed to the tree diagram in FIG. 4B which is equivalent to that flowchart. The method of the present invention for transforming a flowchart to a tree diagram is characterized in that: representing logic structures in the flowchart with branching nodes in the tree diagram, and representing processing activities in corresponding logic structures in the flowchart with leaf nodes below corresponding branching nodes in the tree diagram.

Figure 5:
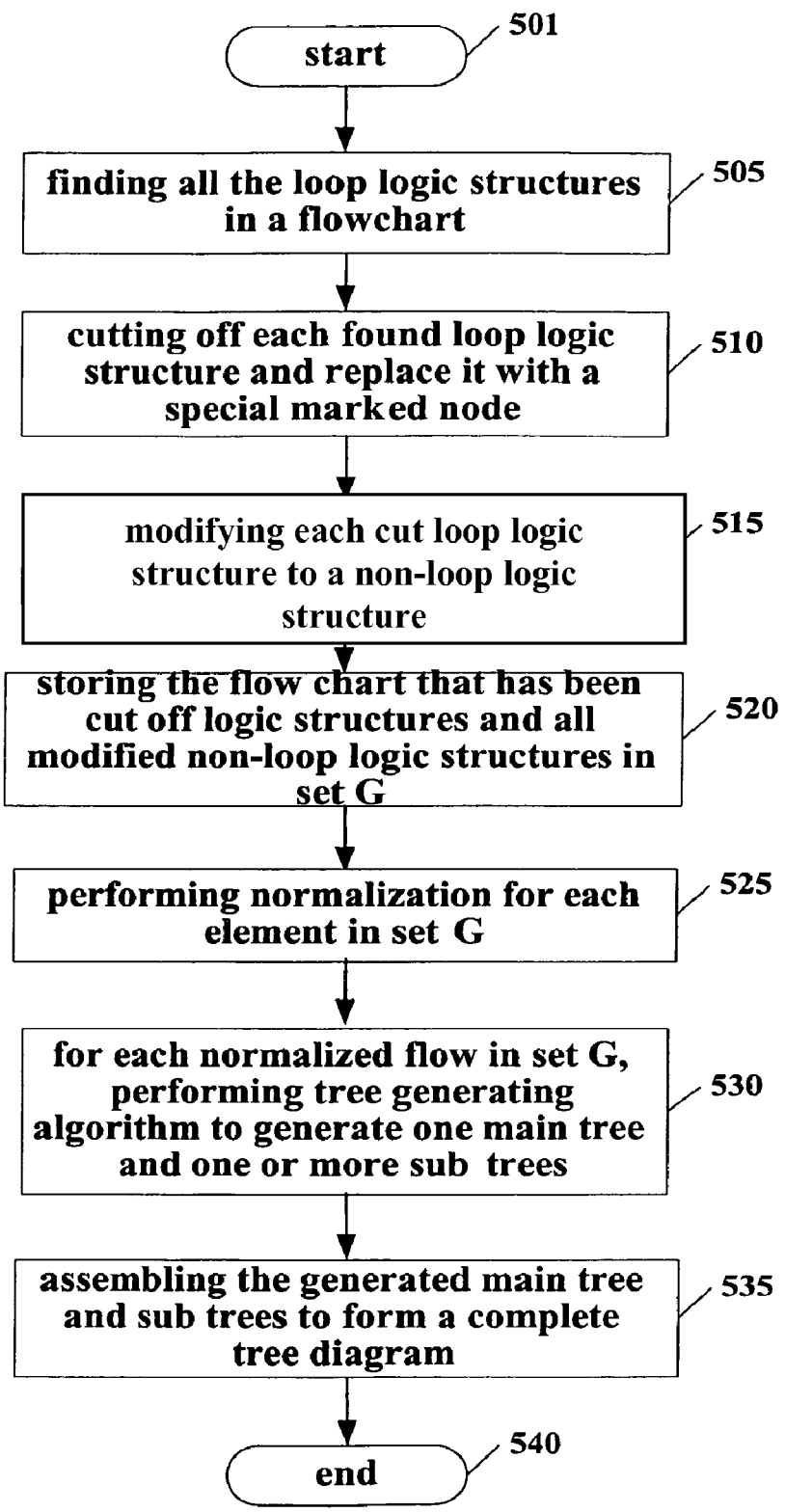
FIG. 5 is a flowchart of the method for transforming a flowchart to a tree diagram according to one embodiment of the present invention.

Next, the specific transformation process will be described in detail in conjunction with one embodiment of the method for transforming a flowchart to an equivalent tree diagram of the present invention. FIG. 5 is a flowchart of the method for transforming a flowchart to a tree diagram according to one embodiment of the present invention. FIGS. 6A-6E show step by step the process of transforming a flowchart to an equivalent tree diagram, taking the flowchart shown in FIG. 4A as an example.

Figure 6A:
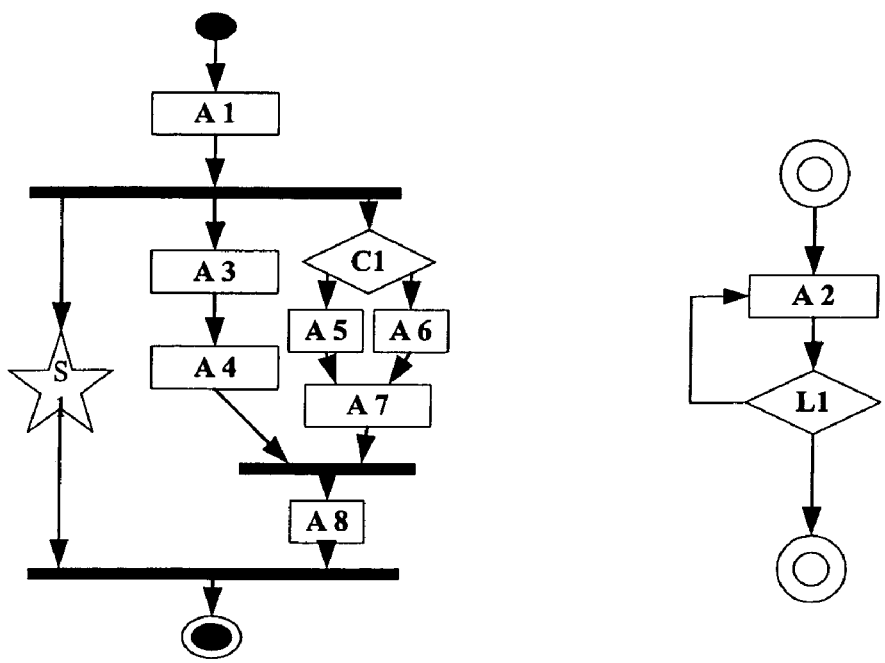
FIGS. 6A-6E gradually show the process of transforming a flowchart to an equivalent tree diagram.

According to this embodiment, first at Step 505, all loops and nested loops in original flowchart are found out. Specifically, in the prior art, there are many known solutions to find out loops in a flow, such as contained in "Conflicts Analysis for Inter-enterprise Business Process Model", Wei Ding et al, the 6$^{th}$ World Multi-conference on SYSTEMICS, CYBERNETICS AND INFORMATICS (SCI 2002)(2002, Orlando, Fla.), "Identifying Loops Using DJ Graphs" by Vugranam C. Sreedhar et al issued at ACAPS Technical Memo 98 on Sep. 10, 1995, and "Flow graph anomalies: What's in a loop?" by Wolfe, M issued at Technical Report CS/E 92-012 (Oregon Graduate Institute for Science and Technology, 1992). The above articles have introduced many methods for finding out loop logic structures in a flow, the content of which is incorporated herein for reference. Next, at Step 510, each found loop logic structure is cut off and replaced with a special marked node in the main flow. As shown in FIG. 6A, after Step 510, the loop logic structure in the original flowchart is cut off and replaced with the special node S1.

Figure 6B:
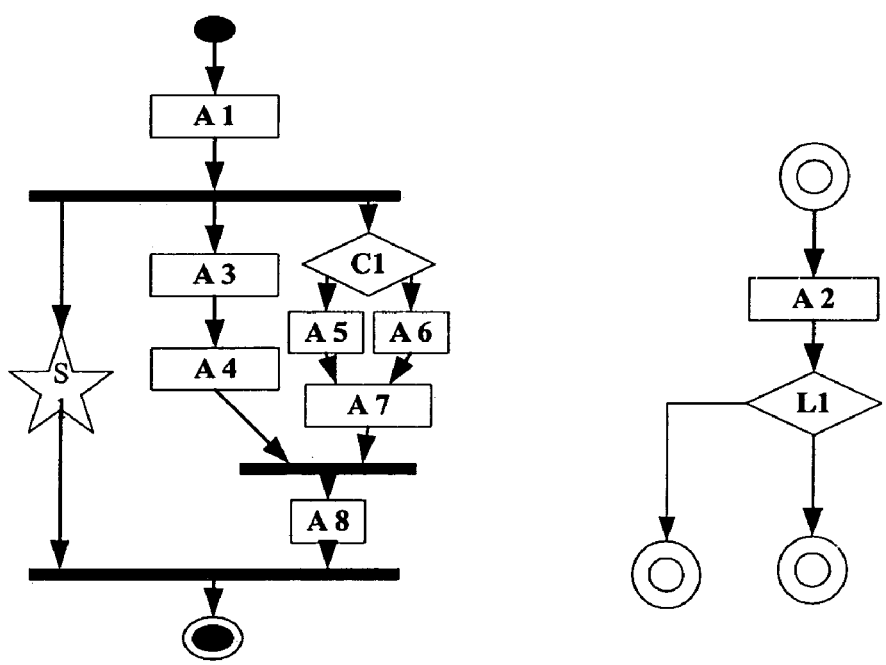

Next, at Step 515, each cut loop logic structure is modified to a non-loop logic structure, as shown in FIG. 6B.

Figure 6C:
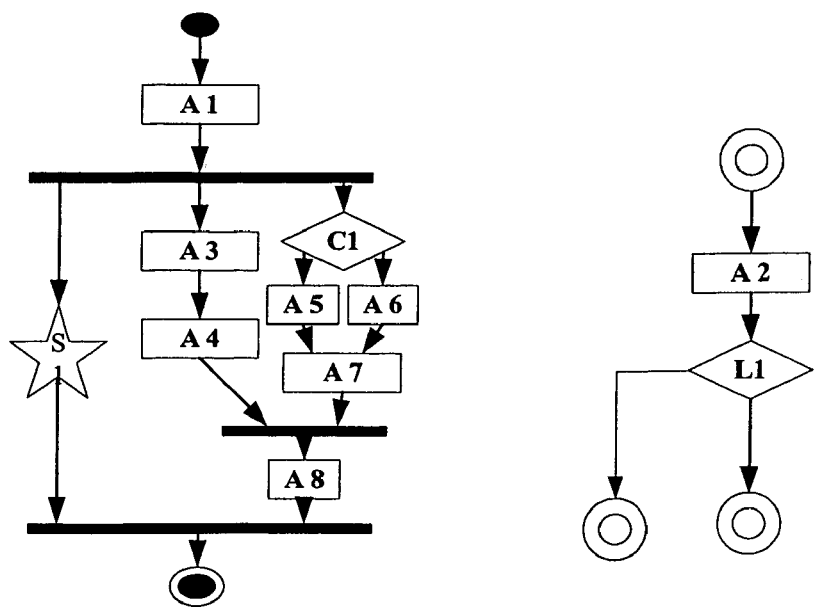
Figure 6D:
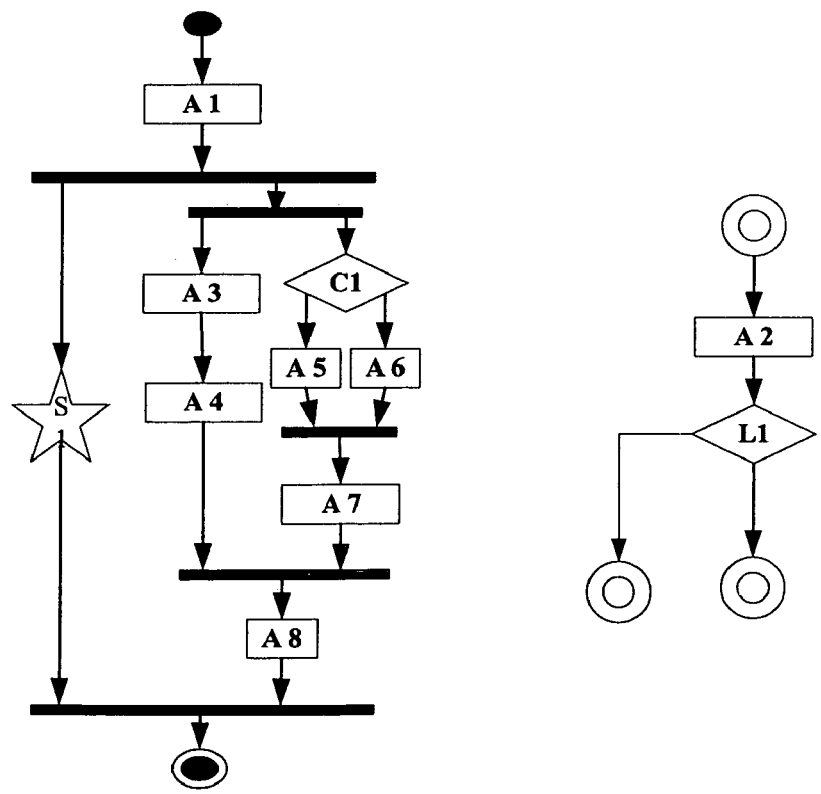

Next, at Step 520, the flowchart that has been cut off loop logic structure and all modified non-loop logic structure are stored as a set G, as shown in FIG. 6C.

Figure 7A:
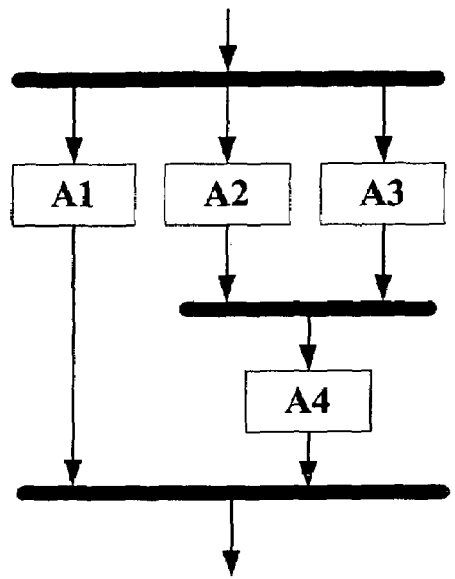
FIGS. 7A-7D illustrate the procedure of normalization processing.
Figure 7B:
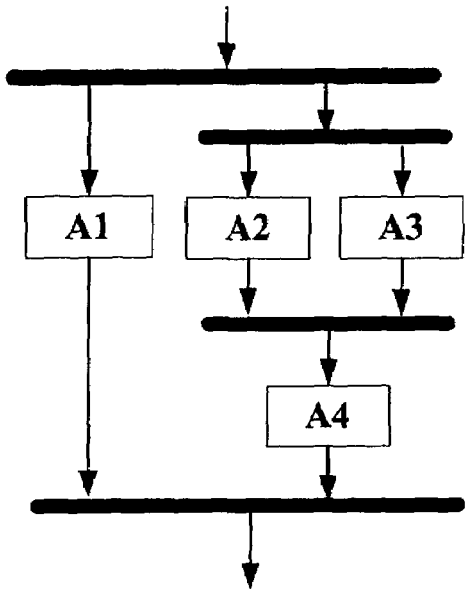
Figure 7C:
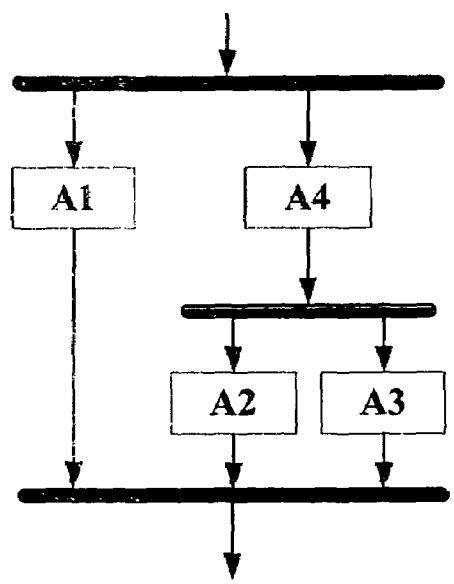
Figure 7D:
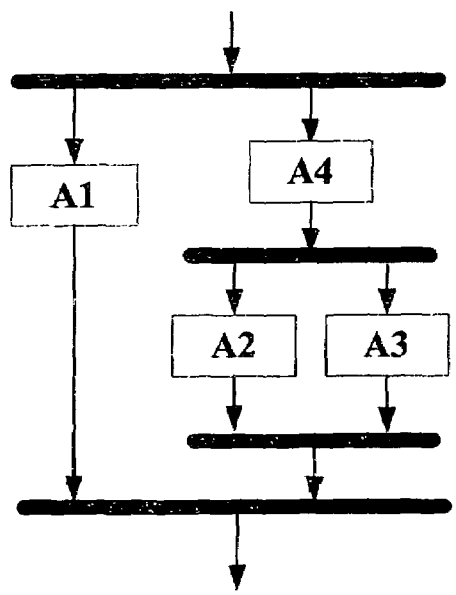

Next, at Step 525, normalization is executed for each element in G. Here, the normalization in the present invention will be explained. When drawing a flowchart, there are often some omission and simplification, for example, FIG. 7A and FIG. 7C are two flowcharts in which some splits & joins are omitted, and their respective complete (normalized) flowcharts should shown as FIG. 7B and FIG. 7D. In the present invention, the normalization of a flow is to recover the simplified flowchart to a normalized flowchart, that is, for each split there is a corresponding join. After Step 525, the result is shown as FIG. 6D.

Figure 6E:
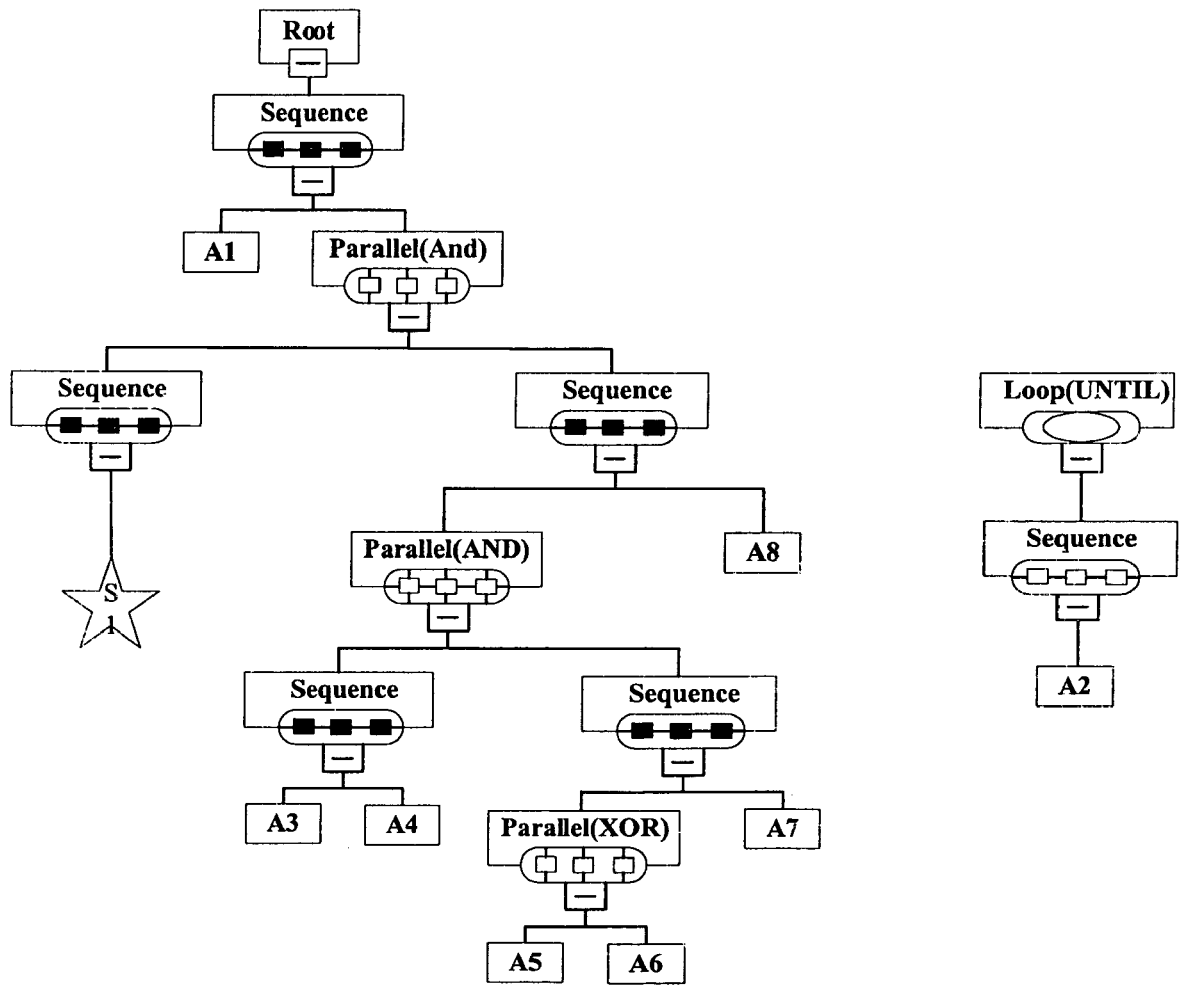

Next, at Step 530, for each normalized flow in set G, Tree Creation Algorithm is executed to create a main tree and one or more sub trees. After the above steps, the loops in the original flowchart has been modified to non-loops and the simplified flows have also been normalized, therefore in this step, we only need to traverse the main flow and each non-loop flow, and transform each node in the flows into the tree structures according to the above mentioned transformation rules. Specific tree creation algorithm can be varied. It will be explained in conjunction with FIG. 8 later, taking a simple tree creation algorithm according to the present embodiment as an example. The result of the present step is shown in FIG. 6E. Next, at Step 535, the generated tree and sub trees are assembled into a complete equivalent tree diagram, the result of which is shown in FIG. 4B. Finally the process ends at Step 540.

Figure 8:
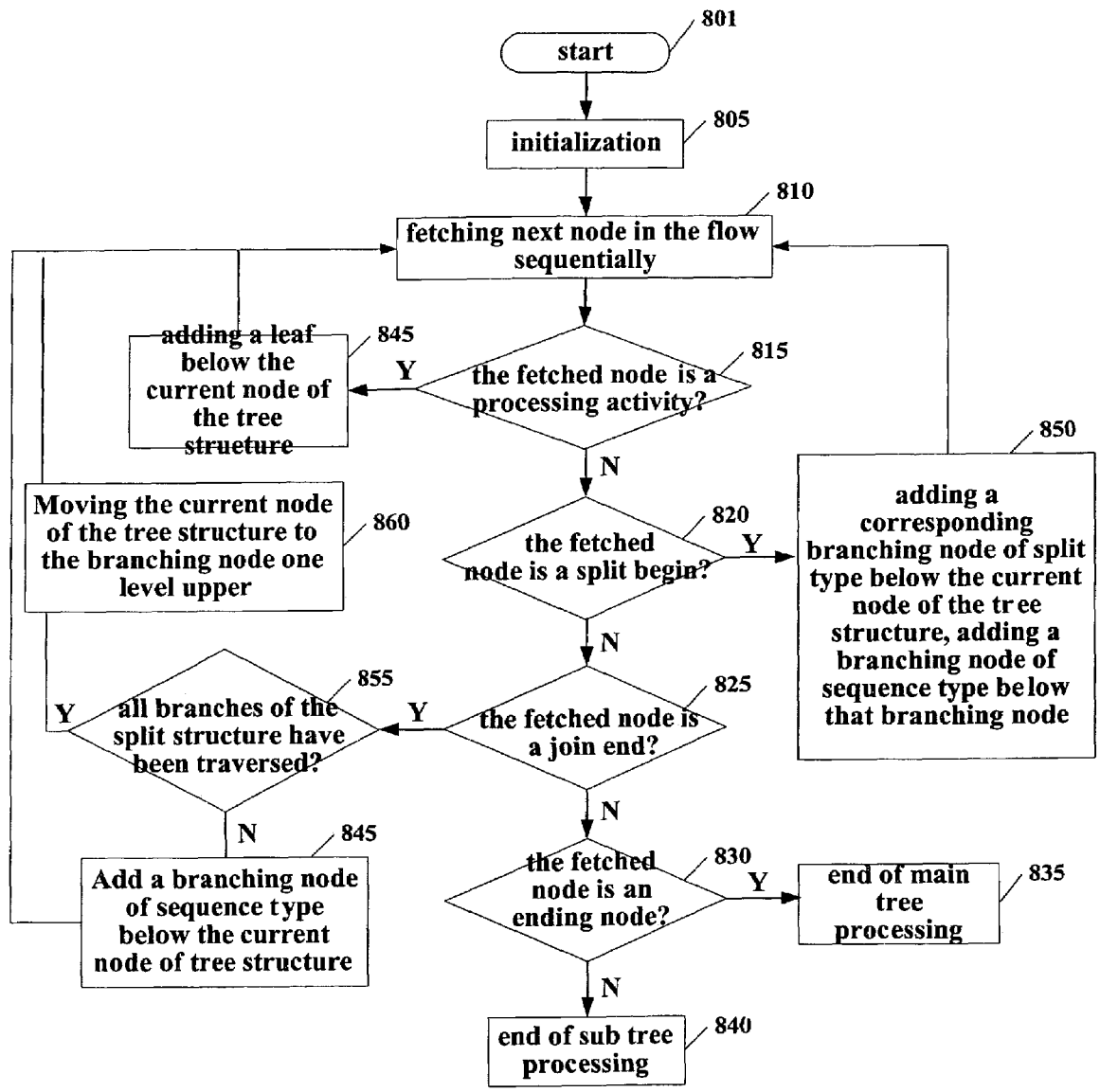
FIG. 8 is a detailed flowchart of the tree creation algorithm according to one embodiment of the present invention.

FIG. 8 is a detailed flowchart of the tree creation algorithm according to one embodiment of the present invention. As shown in FIG. 8, first at Step 805, an initialization is performed, the content of which includes: creating a tree structure which only includes a root node and a sequential branching node, and setting the branching node as the current node; setting the beginning node of the flow as the current node in the flow processed.

Next, at Step 810, a next node in the flow processed is fetched out sequentially. According to the present embodiment, in this step, the flow is traversed using depth-first search to get next node sequentially. Of course all nodes of the flow can also be traversed using other search policies according to different processing steps, it will be described later.

Next, at Step 815-830, the process makes a series of decisions to finally determine the type of the fetched node, thereby taking different processing steps.

Specifically, at Step 815, it is determined whether the fetched node is a processing activity node. If so, proceed to Step 845, in which a corresponding leaf node is added below the current node of the tree structure. And then the process returns to Step 810, a next node in that flow is fetched out and the subsequent steps are repeated.

At Step 820, it is determined whether the fetched node is a node representing a split. If so, proceed to Step 850, in which a corresponding split branching node is added below the current node of the tree structure and a sequence branching node is added below that branching node, and the branching node is set as the current node. And then, the process returns to Step 810, a next node in the flow is fetched out and the subsequent steps are repeated.

At Step 825, it is determined whether the fetched node is a node representing a join. If so, proceed to Step 855, in which a further decision is made as to whether all branches in the split logic structure have been traversed. If the result of Step 855 is "Yes", then proceed to Step 860, otherwise to Step 865.

As shown, if the process proceeds to Step 860, then in that step, the current node of the tree structure is moved to a branching node one level upper than the split branching node. And then, the process returns to Step 810, to fetch a next node in the flow and repeat subsequent steps.

If the process proceeds to Step 865, then in that step, a sequence branching node is added below the split branching node of the tree structure, and is set as the current node. And then, the process returns to Step 810, to fetch a next node in the flow and repeat the subsequent steps.

Finally, if all the determinations of Steps 815, 820, 825 are "No", then at Step 830, it is determined whether the fetched node is an ending node, if so, proceed to Step 835, the processing of main tree is complete, otherwise proceed to Step 840, the processing of sub tree is complete.

Although the tree creation algorithm in the present embodiment is described in conjunction with FIG. 8, those skilled in the art will appreciate that there are many other approaches in addition to the above method, for example, transforming gradually all splits in the flow into tree structures first and then assembling these transformed tree structures sequentially, and different policies can be used to traverse the flowchart, all of these are not limited in the present invention.

The method for transforming a flowchart to an equivalent tree diagram according to the embodiment of the present invention has been described above in conjunction with FIGS. 3-8. It should be noted that in the embodiment shown in FIG. 5, Steps 505-520 and 535 in FIG. 5 can be omitted when the flowchart to be transformed does not include loop logic structure. And Step 525 can be omitted too when the flowchart processed is already a normalized flowchart.

From the above description it can be seen that through the method of the present invention for transforming a flowchart to an equivalent tree diagram, a flowchart can be transformed to an equivalent tree diagram without losing the semantic of the original flowchart, thereby both the advantage of flowchart and tree diagram can be utilized.

Method for Transforming an Equivalent Tree Diagram to a Flowchart

Under the same inventive conception, according to another aspect of the present invention, there is provided a method for transforming an equivalent tree diagram to a flowchart, the equivalent tree diagram can be generated by, for example, the above mentioned method for transforming a flowchart to an equivalent tree diagram. The method will be described in the following in conjunction with the accompany drawings.

The method of the present invention for transforming an equivalent tree diagram to a flowchart actually transforms (recovers) the branching nodes in the equivalent tree diagram to corresponding logic structures in flowchart, and transforms (recovers) the leaf nodes below the branching nodes in the equivalent tree diagram to processing activities in corresponding logic structures in the flowchart.

Figure 9:
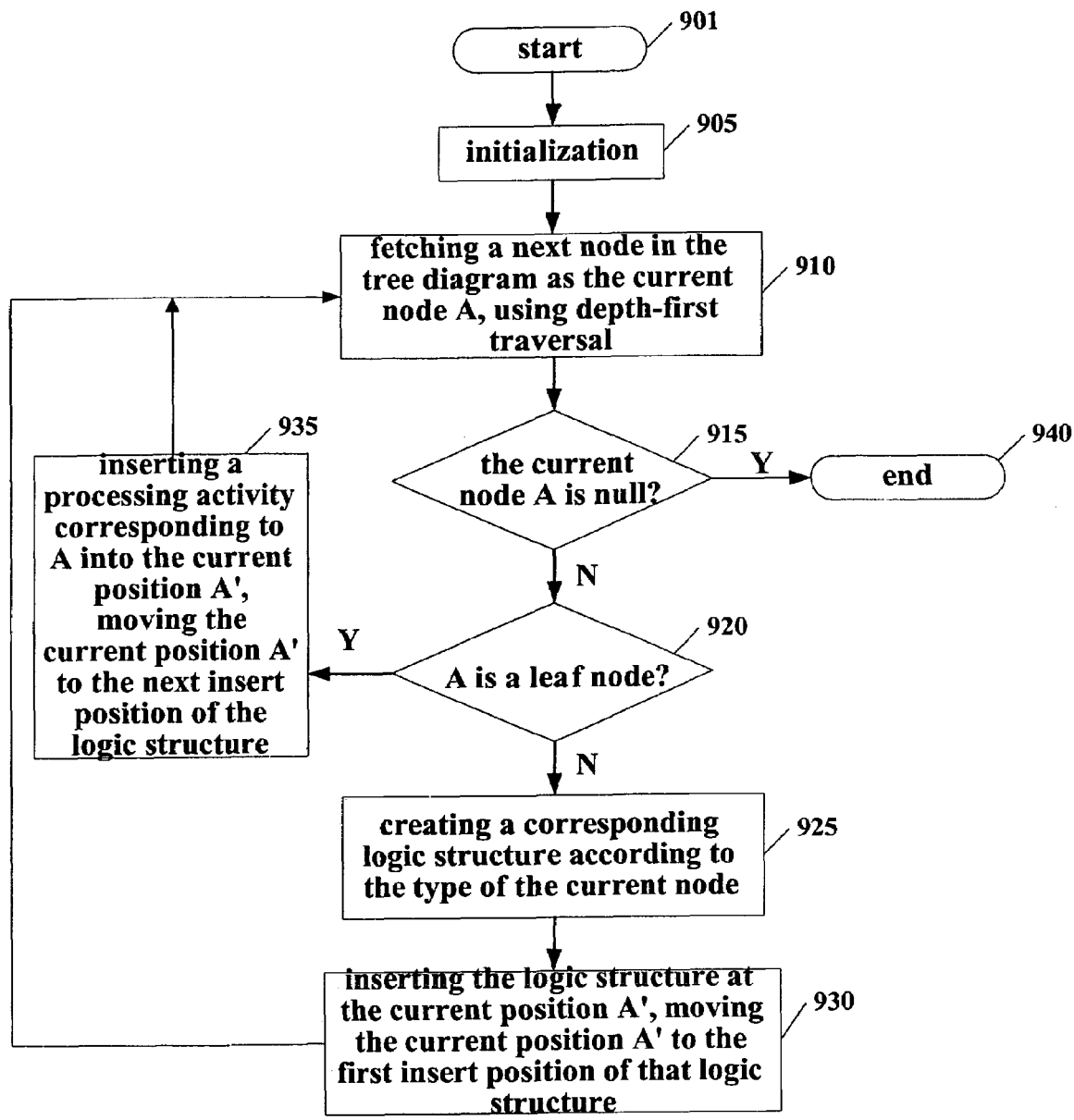
FIG. 9 is a flowchart of the method for transforming an equivalent tree diagram to a flowchart according to one embodiment of the present invention.
Figure 10A:
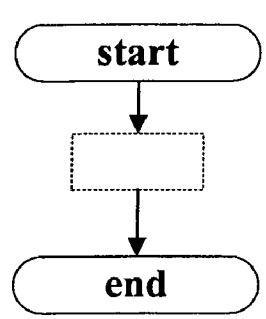
FIGS. 10A-10J gradually show the process of transforming an equivalent tree diagram to a flowchart.
Figure 10B:
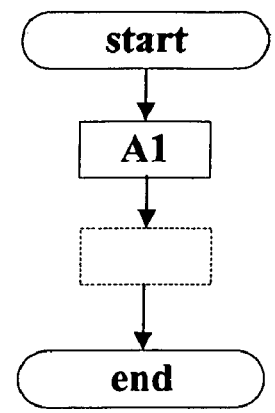
Figure 10C:
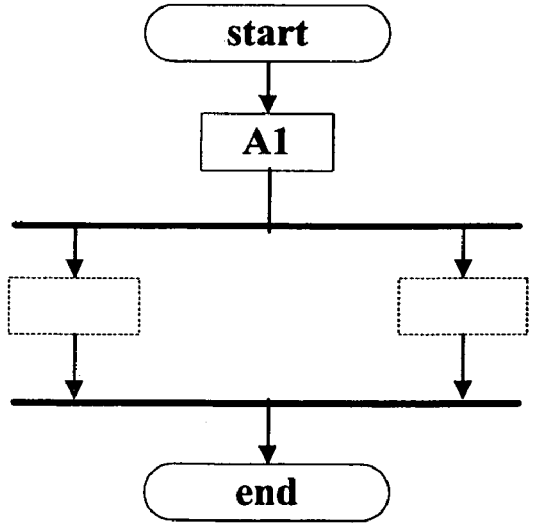
Figure 10D:
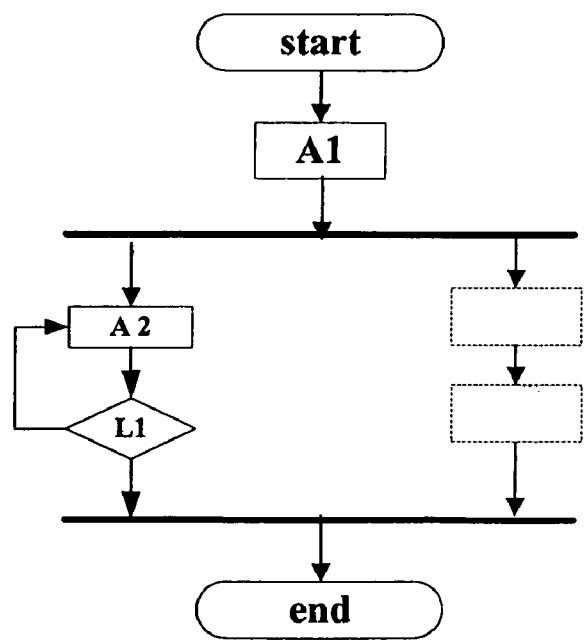
Figure 10E:
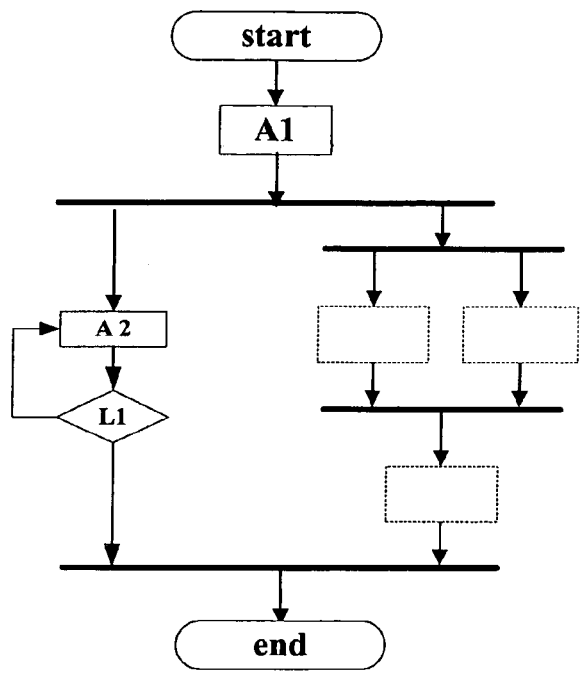
Figure 10F:
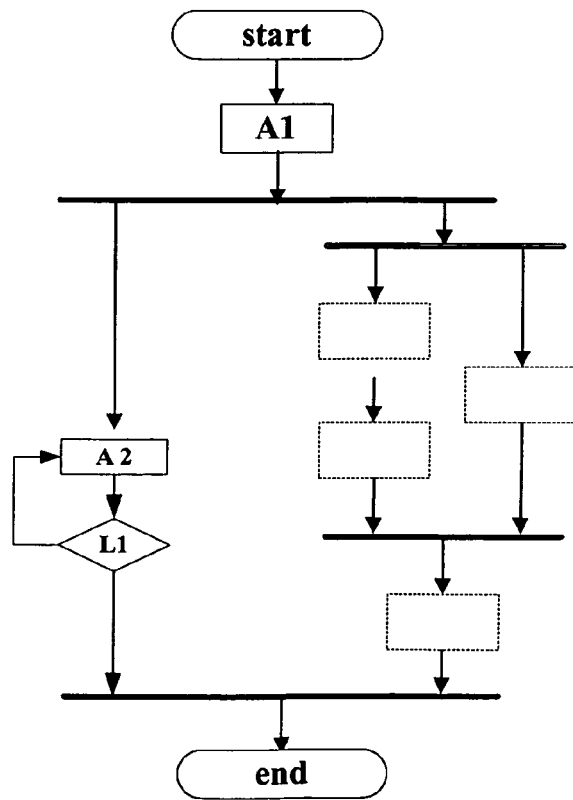
Figure 10G:
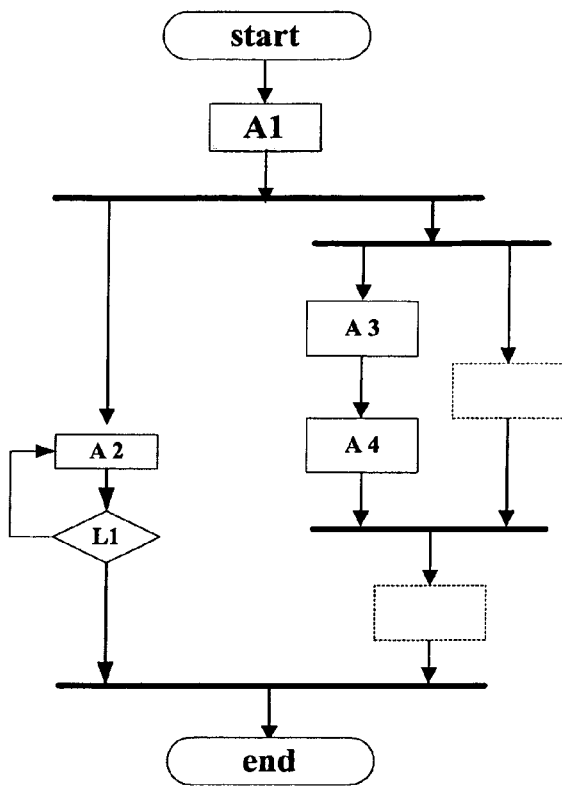
Figure 10H:
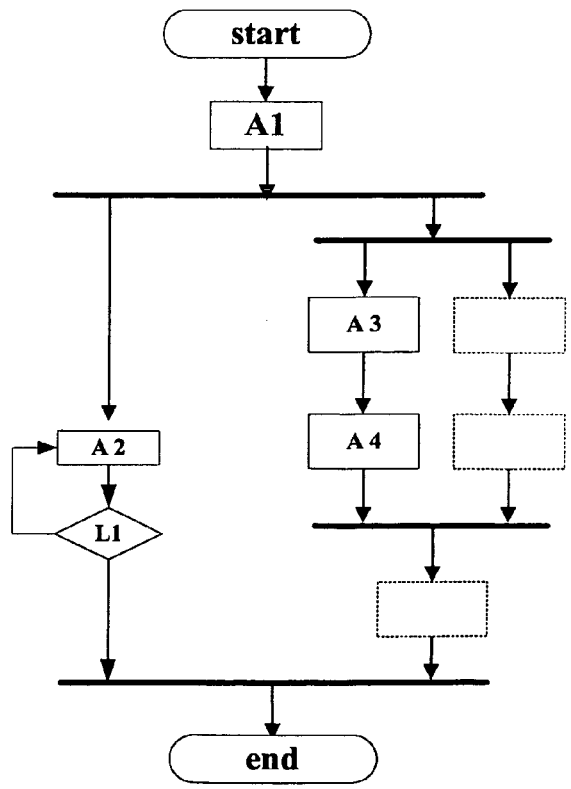
Figure 10I:
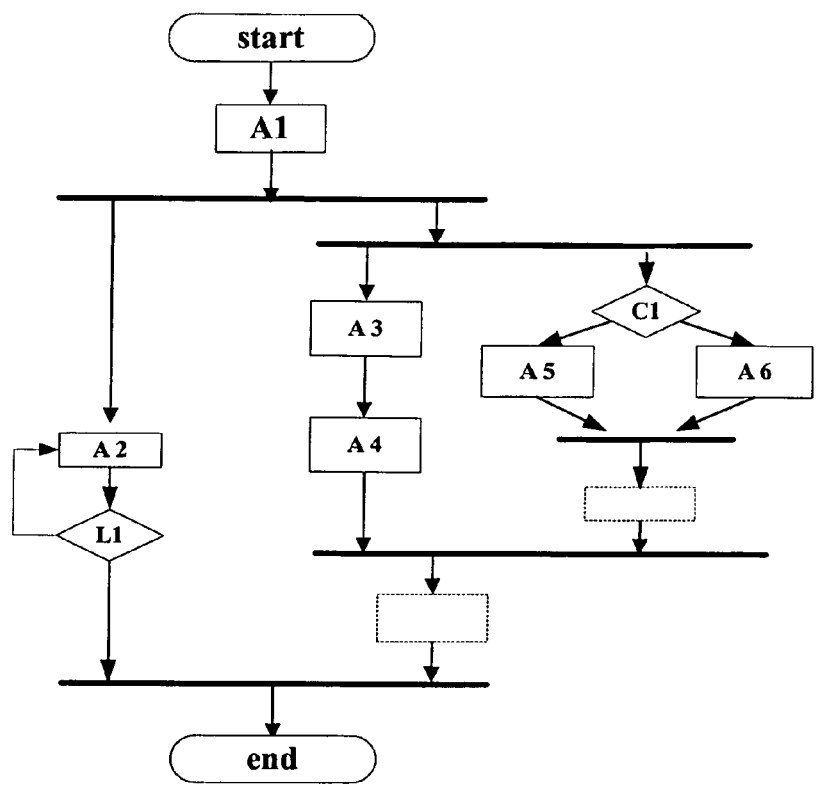
Figure 10J:
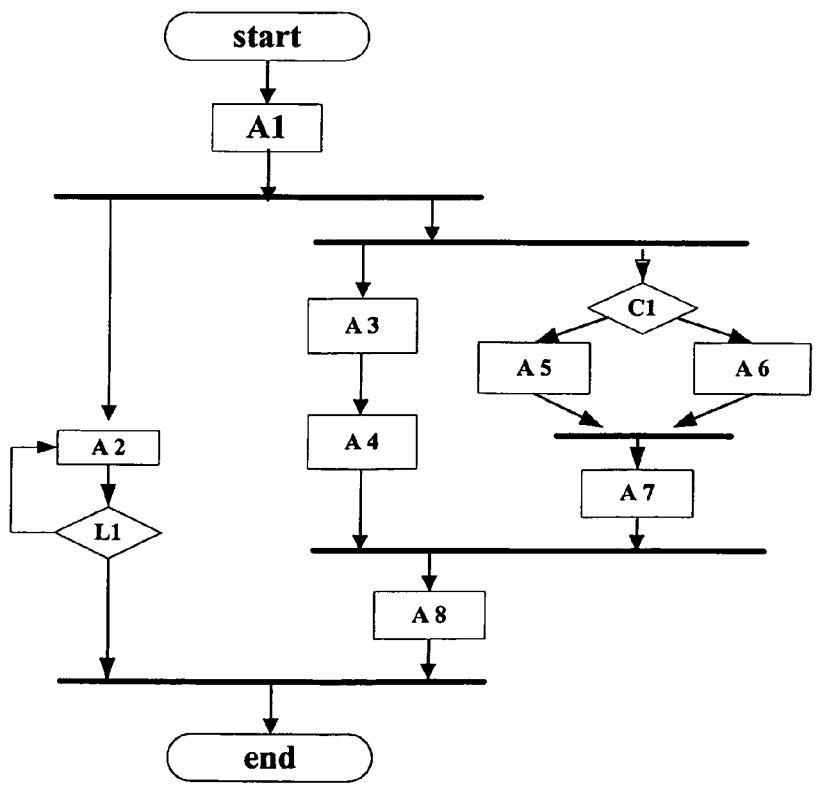

Next, a specific transform process will be described in detail in conjunction with the embodiment of the present invention of the method for transforming an equivalent tree diagram to a flowchart. FIG. 9 is a flowchart of the method for transforming an equivalent tree diagram to a flowchart according to one embodiment of the present invention.

As shown in FIG. 9, first at Step 905, an initialization is performed. Specifically, a flowchart that only includes a beginning node and an end node is initialized, and the position between beginning node and end node is set as the current position A', and the root node of the equivalent tree diagram is set as the current node.

Next, at Step 910, fetching a next node in the tree diagram as the current node A in the manner of depth first traversal.

Next, at Step 915, it is determined whether the current node A is null, if so, proceed to Step 940 and end, otherwise proceed to Step 920.

At Step 920, it is determined whether the current node A is a leaf node, if so, proceed to Step 935, otherwise proceed to Step 925.

If the process proceeds to Step 925, then in that step, a corresponding logic structure is created according to the type of current node, for example, a sequence logic structure, a split logic structure, a loop logic structure, etc. Next at Step 930, the logic structure is inserted into the current position A' and the current position A' is moved to the first insert position in that logic structure, for example, the first node in the sequence logic structure, the first branch in the split logic structure, the loop-body of the loop logic structure, etc. Then the process returns to Step 910 and repeats the subsequent processing.

If the process proceeds to Step 935 from Step 920, then at that step, a processing activity node corresponding to current node A is inserted into the current position A' and the current position A' is moved to the next insert position in that logic structure. Then the process returns to Step 910 and repeats the subsequent processing.

FIGS. 10A-10J show gradually the process of transforming an equivalent tree diagram to a flowchart, taking the tree diagram shown in FIG. 4B as an example.

It should be noted that although the method of the present invention for transforming an equivalent tree diagram to a flowchart has been described according to the embodiment shown in FIG. 9, the present invention is not limited to that embodiment. For example, an equivalent tree diagram is traversed in width-first manner or other searching manners.

From the above description it can be seen that through the method of the present invention for transforming an equivalent tree diagram to a flowchart, the equivalent tree diagram generated by the above mentioned method for transforming a flowchart to an equivalent tree diagram can be transformed (recovered) to a flowchart, thereby both the advantage of flowchart and tree diagram can be utilized.

Method for Editing a Flowchart

Under the same inventive conception, according to another aspect of the present invention, there is provided a method for editing a flowchart. The method will be described in the following in conjunction with the accompany drawings.

Figure 11:
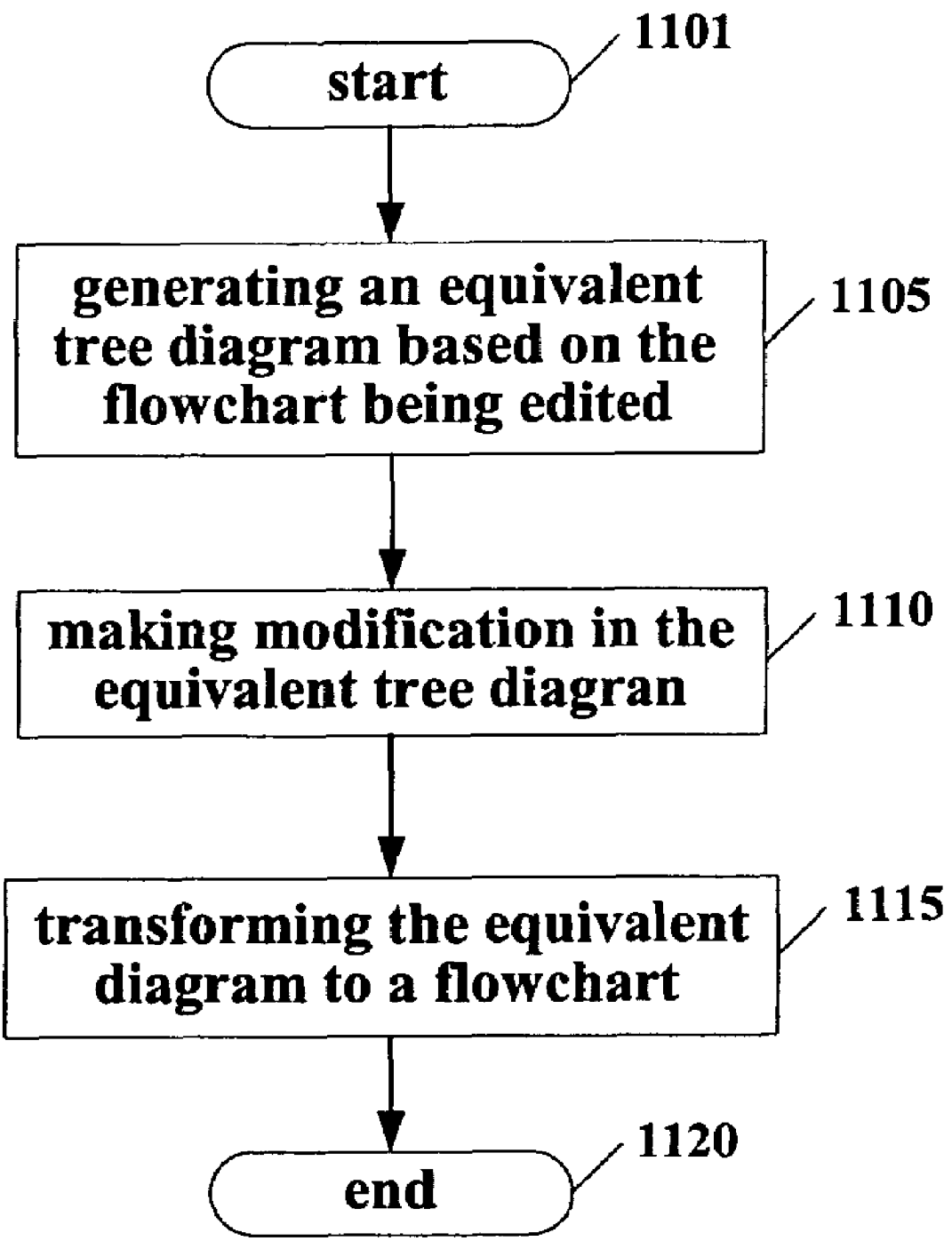
FIG. 11 is a flowchart of the method for editing a flowchart according to one embodiment of the present invention.

FIG. 11 is a flowchart of the method for editing a flowchart according to one embodiment of the present invention. As shown in FIG. 11, first at Step 1105, an equivalent tree diagram is generated based on the edited flowchart. Specifically, the present step generates the equivalent tree diagram through the above described method for transforming a flowchart to an equivalent tree diagram.

Figure 16:
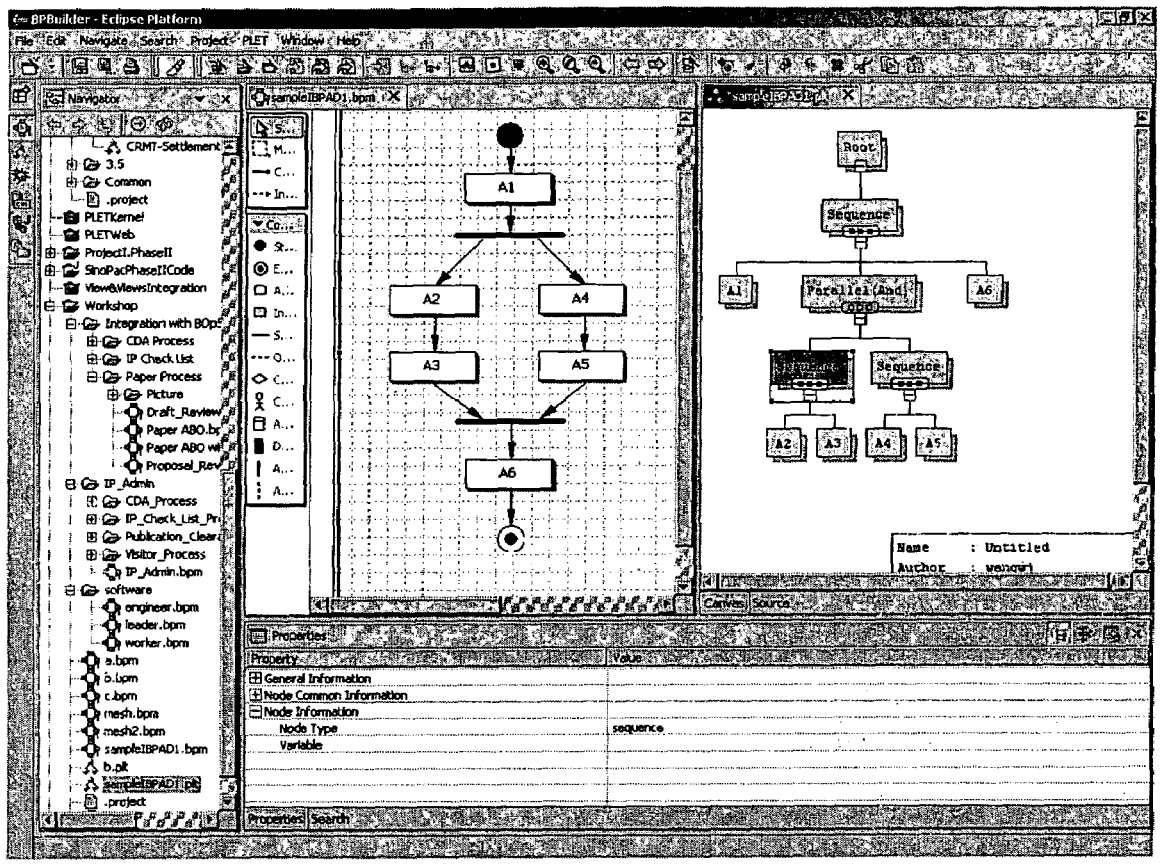
FIG. 16 illustratively shows an interface screen for a user to perform operations of editing a flowchart.

Next, at Step 1110, modification is made in the equivalent tree diagram. The method for editing a flowchart of the present embodiment is suitable for users to make edition and modification explicitly in the equivalent tree diagram. That is, the system displays the generated equivalent tree diagram directly to users and allows user to operate that diagram directly; for example, FIG. 16 illustratively shows a user interface for the user to edit a flowchart.

Specifically, the modification in the present step can comprise: modifying node position, for example, the user can drag & drop a leaf node or a sub tree in the tree diagram to a new position, or copy & paste a leaf node or a sub tree to a new position; modifying node type, user may also change the type attribute of a branching node in the tree diagram, for example, changing an AND split type branching node to the OR split type, etc.

Then, at Step 1115, the equivalent tree diagram is transformed to a flowchart, specifically, through the above described method for transforming an equivalent tree diagram to a flowchart. Such that the modification the user made in the equivalent tree diagram will be reflected in the flowchart. Finally the process ends at Step 1120.

The method for editing a flowchart of the present embodiment utilizes the advantage of the equivalent tree diagram, it can greatly simplify the operation of modifying a flowchart through allowing the user to edit in the equivalent tree diagram directly. For example, for the case described in the section of background of the invention in which a lot of steps are needed to modify a flowchart, only one step is needed through the method of the present embodiment.

Figure 12:
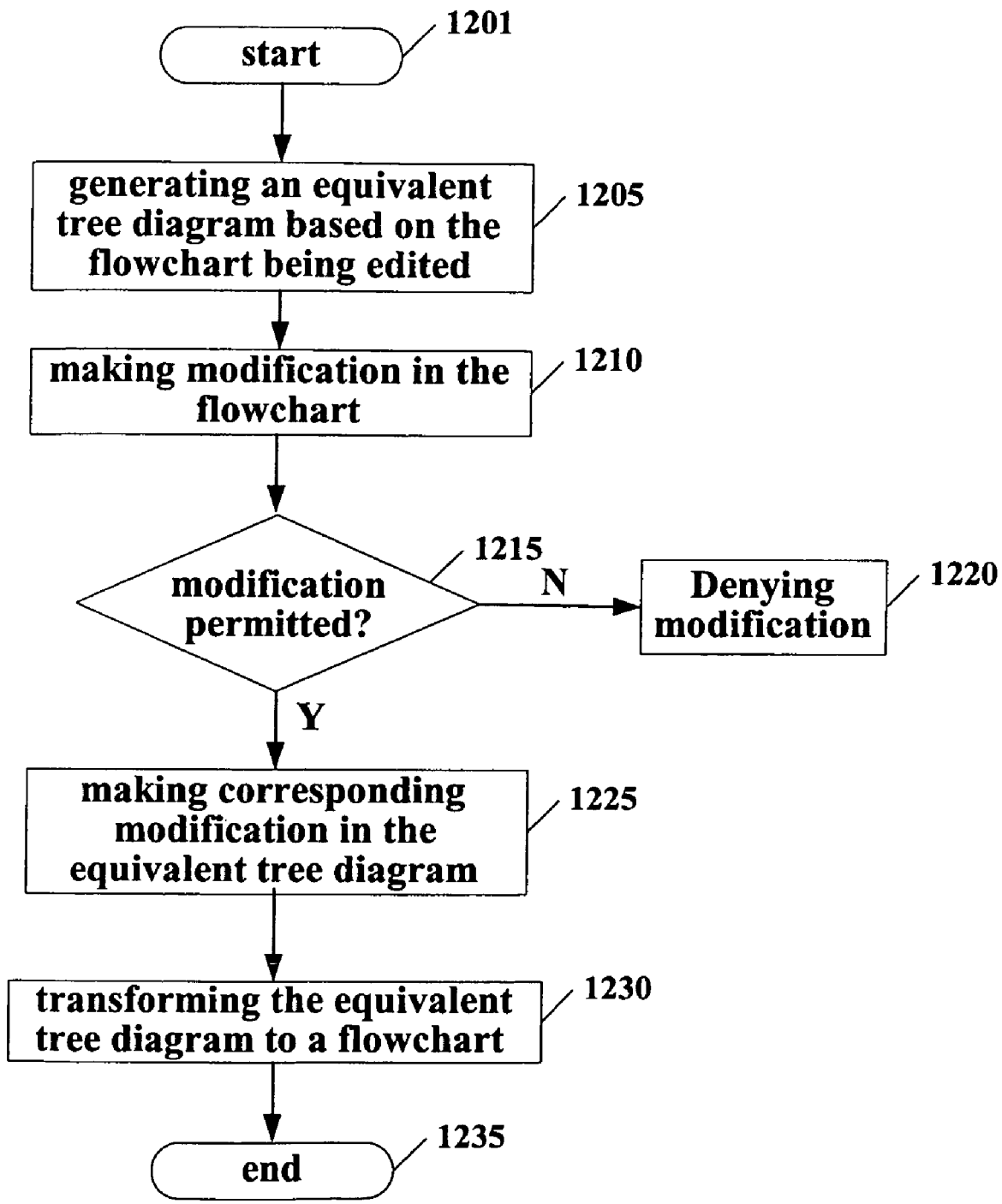
FIG. 12 is a flowchart of the method for editing a flowchart according to one embodiment of the present invention.

FIG. 12 is a flowchart of the method for editing a flowchart according to another embodiment of the present invention. As shown in FIG. 12, first at Step 1205, an equivalent tree diagram is generated based on the flowchart being edited. Like the previous embodiment, the present step also uses the above described method for transforming a flowchart to an equivalent tree diagram to generate the equivalent tree diagram.

Next, at Step 1210, modification is made in the flowchart. The method for editing a flowchart of the present embodiment is suitable for a user to edit and modify implicitly in the flowchart. That is, the generated equivalent tree diagram is not displayed to the user for editing; rather it is stored in memory. The user still make modifications in the flowchart, for example, drag & drop one or more nodes, delete or copy one or more nodes, etc.

Next, at Step 1215, it is determined whether the user's modification is permitted. Specifically, the present step determines the validness of the user's modification using the equivalent tree diagram. For example, if the nodes selected by the user correspond to a sub tree in the equivalent tree diagram, or the nodes selected by the user correspond to multiple sub trees in the equivalent tree diagram and these sub trees have a same parent node in common, then it is permitted, otherwise it is not permitted. If the determination in present step is Yes, then the process proceeds to Step 1225, otherwise proceeds to Step 1220, the modification is denied and the process ends at Step 1235.

If the process proceeds to Step 1225, then at that step, the corresponding modification is made in the equivalent tree diagram. Then at Step 1230, the equivalent tree diagram is transform to a flowchart (using the above described method for transforming an equivalent tree diagram to a flowchart). Finally, the process ends at Step 1235.

The method for editing a flowchart of the present embodiment utilizes the advantage of the implicit equivalent tree diagram, it can verify the validness of user's editing operation, and on the other hand it can greatly improve the convenience of modifying a flowchart. For example, for the case described in the section of background of the invention in which a lot of steps are needed to modify a flowchart, it is greatly simplified in the method of present embodiment through the transformation of the equivalent tree diagram.

Method for Verifying Reorganizing of a Flowchart

Under the same inventive conception, according to another aspect of the present invention, there is provided a method for verifying reorganization of a flowchart. The method will be described in the following in conjunction with the accompany drawings.

Figure 13:
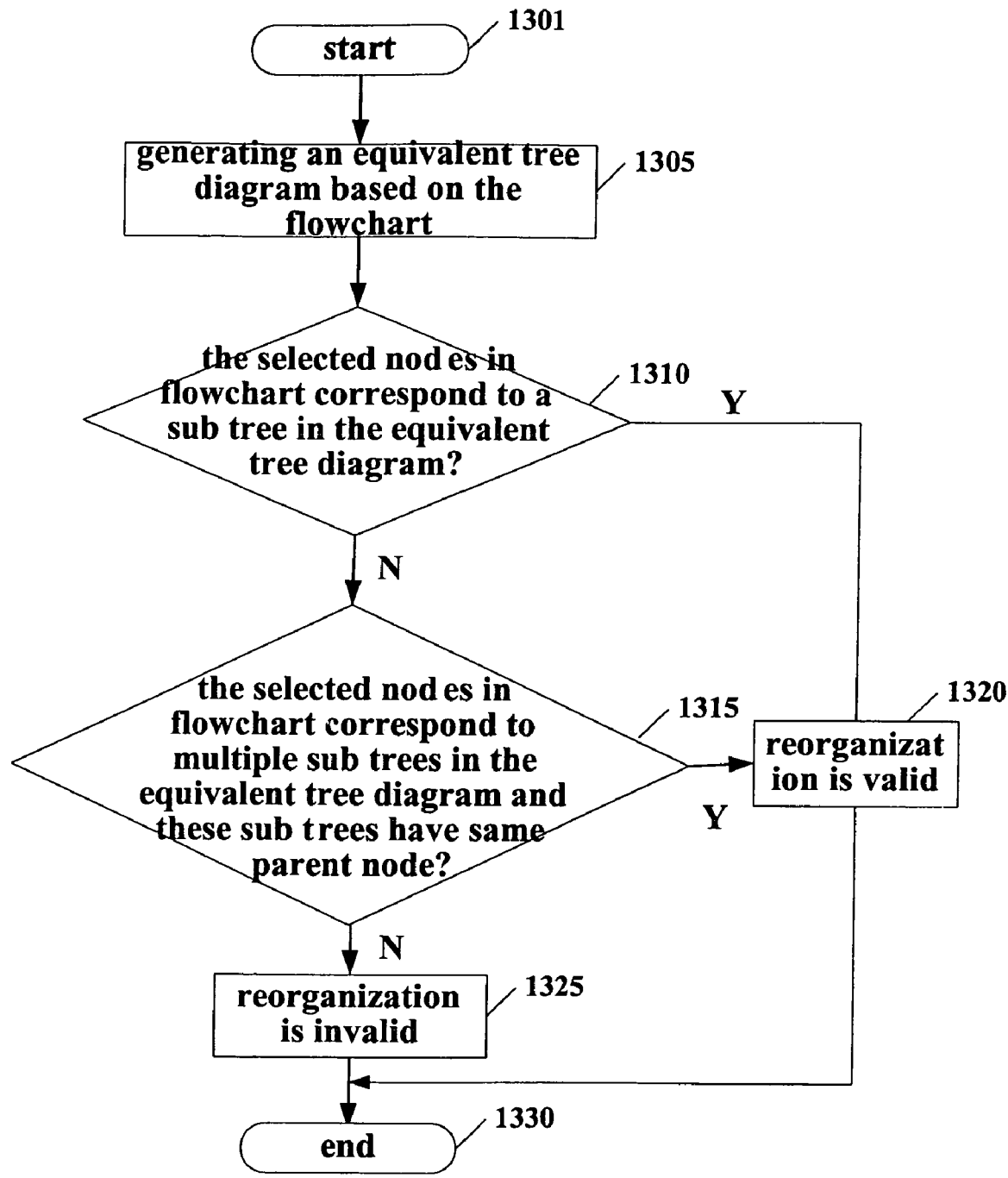
FIG. 13 is a flowchart of the method for verifying reorganization of a flowchart according to one embodiment of the present invention.

FIG. 13 is a flowchart of the method for verifying reorganization of a flowchart according to one embodiment of the present invention. Reorganization of a flowchart in present invention refers to the modification related to the structure of the flowchart, for example, drag & drop one or more nodes to a new position, copy & paste one or more nodes to a position or delete one or more nodes, etc.

As shown in FIG. 13, first at Step 1305, an equivalent tree diagram is generated based on the flowchart. Specifically, the present step uses the above described method for transforming a flowchart to an equivalent tree diagram to generate the equivalent tree diagram.

Next, it is determined whether the nodes selected as the object to be modified in the flowchart are corresponding to a sub tree in the equivalent tree diagram. If Yes, then at Step 1320, it is verified that the reorganization is valid, otherwise the process proceeds to Step 1315.

At Step 1315, it is determined whether the nodes selected as the object to be modified in the flowchart are corresponding to multiple sub trees in the equivalent tree diagram and these sub trees have a same parent node in common. If Yes, then at Step 1320, it is verified that the reorganization is valid, otherwise at Step 1325, it is determined that the reorganization is invalid.

Finally, the process ends at Step 1330.

The method for verifying reorganization of a flowchart of the present embodiment utilizes the advantage of equivalent tree diagram, it can verify the validness of user's editing operation, thereby raising computer's capability to process a flowchart to a new height of understanding the flowchart semantically.

Method for Creating a Flowchart

Under the same inventive conception, according to another aspect of the present invention, there is provided a method for creating a flowchart. The method will be described in the following in conjunction with the accompany drawings.

It is also possible to create a flowchart using an equivalent tree diagram based on the above-mentioned definition of equivalent tree diagram and the transformation rules against flowchart. First, an equivalent tree diagram is created according to the process (referred to as tasks in the present invention) to be modeled, that is, representing logic structures with branching nodes and representing processing activities with leaf nodes; then the equivalent tree diagram is transformed to a flowchart through the above described method.

Figure 15:
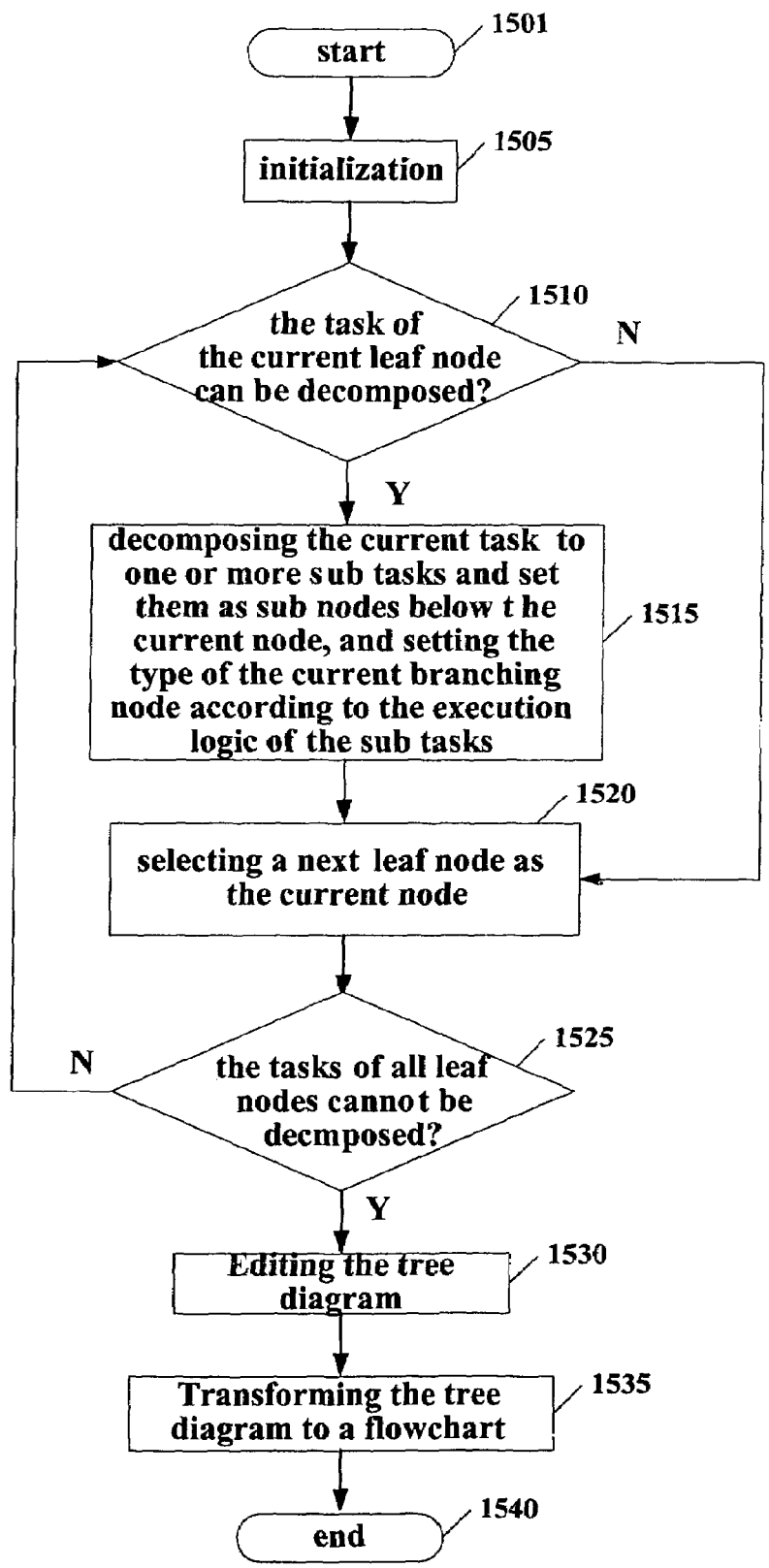
FIG. 15 is a flowchart of the method for creating a flowchart according to one embodiment of the present invention.

FIG. 15 is a flowchart of the method for creating a flowchart according to one embodiment of the present invention. As shown in FIG. 15, first at Step 1505, an initialization is performed. Specifically, a tree diagram that only includes one root node and one leaf node is created, and the leaf node is set as the current node. This only leaf node represents all of the tasks (the whole process) to be modeled.

Next, at Step 1510, it is determined whether the current leaf node can be decomposed. If Yes, the process proceeds to Step 1515, otherwise to Step 1520.

If the process proceeds to Step 1515, then at that step, the task of the current node is decomposed into one or more sub tasks, which are taken as sub nodes below the current node, and the type of the branching node for the current node is set according to the sub task's execution logic(flow logic). That is, when a task can be decomposed into multiple sub tasks, then by performing the above Step 1510 and 1515, the task can be represented in the tree diagram with leaf nodes representing the sub tasks and the type of branching node corresponding to the execution logic of the sub tasks. As described in the above embodiment, the execution logic of sub tasks can comprise: sequence logic, split logic and loop logic, and split logic can further comprise: AND split logic, OR split logic and XOR split logic. Accordingly, the branching nodes in the tree diagram also comprises: sequence logic type branching node, AND split logic type branching node, OR split logic type branching node, XOR split logic type branching node and loop logic type branching node.

Next, at Step 1520, a next leaf node is selected as the current node. Here, the sequence in which the next leaf node is selected has no limitation in the present invention, it may be various, such as depth-first or broad-first, as long as it traverses all leaf nodes one by one.

Next, at Step 1525, it is determined whether the tasks of all the leaf nodes can't be further decomposed. If yes, then the process proceeds to Step 1530, otherwise returns to Step 1510 to repeat the above Steps 1510-1525.

If the process proceeds to Step 1530, then at that step, the user can edit the generated tree diagram, for example, reorganize, delete and modify, etc. Of course this step is optional, the user may also choose not to make any edition.

Then at Step 1535, the generated equivalent tree diagram is transformed to a flowchart through the above described method for transforming an equivalent tree diagram to a flowchart.

Finally, the process ends at Step 1540.

From the above description it can be seen that the user may model a business flow with a tree diagram first and then transform it to a conventional flowchart through the method for creating a flowchart of the present invention. When modeling with a tree diagram, it is very convenient to perform modification, edition operation, it also can provide a prospect which is different from the traditional flowchart for analyzing business flow (process), which brings more comprehensive and deep understanding in business flow for the user.

Flowchart Editor

Under the same inventive conception, according to another aspect of the present invention, there is provided a flowchart editor. It will be described in the following in conjunction with the accompany drawings.

Figure 14:
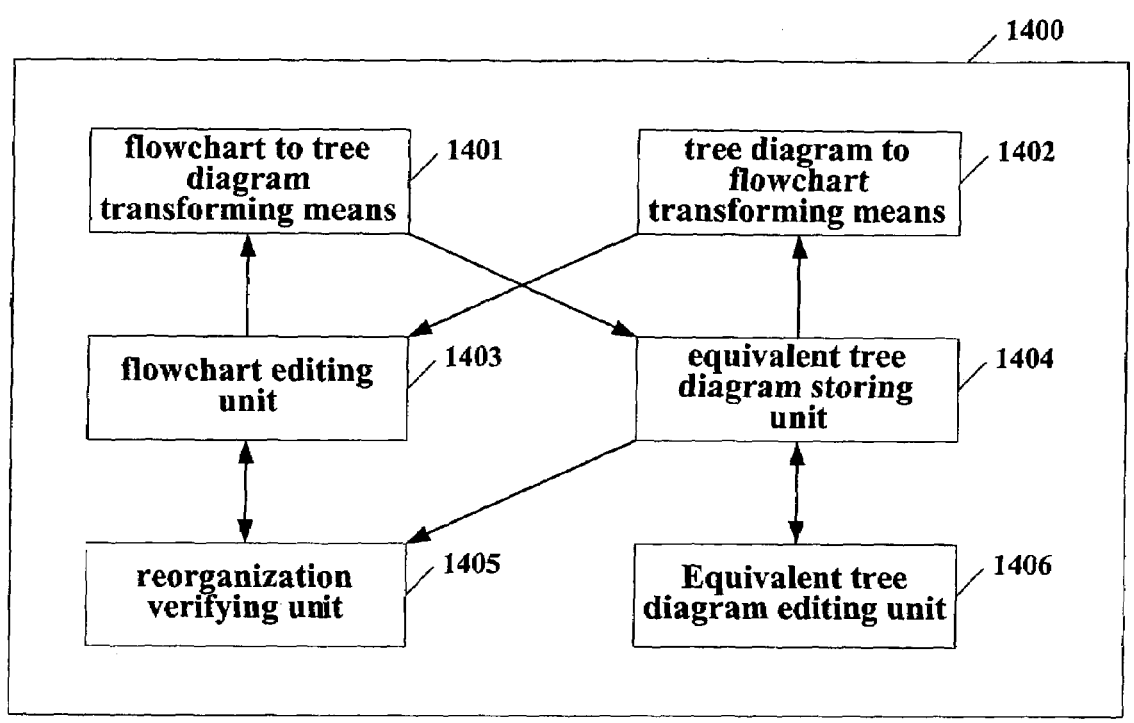
FIG. 14 is a block diagram illustrating the structure of the flowchart editor according to one embodiment of the present invention.

FIG. 14 is a block diagram illustrating the structure of the flowchart editor according to one embodiment of the present invention. As shown in FIG. 14, the flowchart editor 1400 of the present embodiment comprises: a flowchart editing unit 1403 which is equivalent to and has the function of a traditional flowchart editor. The flowchart editor 1400 of the present embodiment, on the basis of traditional flowchart editor, further comprises: flowchart to tree diagram transforming means 1401 for transforming a flowchart to an equivalent tree diagram; tree diagram to flowchart transforming means 1402 for transforming an equivalent tree diagram to a flowchart; an equivalent tree diagram storing unit 1404 for storing the equivalent tree diagram generated by the flowchart to tree diagram transforming means 1401; an equivalent tree diagram editing unit 1406 for editing the equivalent tree diagram generated by the flowchart to tree diagram transforming means 1401; a reorganization verifying unit 1405 for verifying the validness of editing operation the user made in the flowchart editing unit 1403.

Operationally, the flowchart to tree diagram transforming means 1401 in the flowchart editor 1400 of the present embodiment can implement the above described method for transforming a flowchart to an equivalent tree diagram, the tree diagram to flowchart transforming means 1402 can implement the above described method for transforming an equivalent tree diagram to a flowchart, the reorganization verifying unit 1405 can implement the above described method for verifying reorganization of a flowchart. Further, operationally, the flowchart editor 1400 of the present embodiment can implement the above described method for editing and creating a flowchart.

It should be noted that the flowchart editor of the present invention and its components can be implemented in the form of hardware and software, and can be combined with other devices as need, for example, it can be implemented on various devices having computing capability, such as a personal computer, a notebook computer, a palmtop computer, a PDA, a word processor etc, and can be physically separated but operationally interconnected to accomplish the function.

Although the method for transforming a flowchart to an equivalent tree diagram, the method for transforming an equivalent tree diagram to a flowchart, the method for verifying reorganization of a flowchart, the method for editing a flowchart, the method for creating a flowchart and the flowchart editor of the present invention has been described in detail with some illustrative embodiments in the above, these embodiments are not exhaustive, various changes and modifications may be affected by one skilled in the art within the spirit and scope of the invention. Accordingly, the invention is not limited to these embodiments, the scope of the invention is only defined by the appended claims.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A method comprising:
   A) using a flowchart editor for generating an equivalent tree diagram from a flowchart, comprising steps of:
      traversing the flowchart, wherein said flowchart comprises a main processing flow, a logic structure within said main processing flow, and a processing activity in said logic structure;
      forming a main tree corresponding to the main processing flow;
      transforming the logic structure in the flowchart to a sub tree comprising a branching node in the equivalent tree diagram;
      assembling the sub tree to the main tree;
      transforming a task required by the processing activity to a leaf node below the branching node in the sub tree; and
      decomposing the task represented by the leaf node to at least one sub task and setting each sub task as a child leaf node below the leaf node;
      modifying the leaf node to a sub-branching node of a type corresponding to an execution logic of the at least one sub task, wherein the execution logic comprises a loop logic structure and at least one of: a sequence logic structure and a split logic structure; and
      repeating the decomposing and modifying steps until the tasks represented by all the leaf nodes in the equivalent tree diagram cannot be further decomposed;
   B) using an equivalent tree diagram storing unit for storing the equivalent tree diagram generated by the flowchart;
   C) using an equivalent tree diagram editing unit for editing the equivalent tree diagram, comprising steps of:
      finding the at least one loop logic structure in the flowchart;
      selecting at least one node in the flowchart for editing,
      using a reorganization verifying unit for verifying validity of the editing, comprising:
         determining that the editing is valid when the at least one node corresponds to a sub tree in the equivalent tree diagram;
         determining that the editing is valid when the at least one node corresponds to a plurality of sub trees in the equivalent tree diagram and said plurality of sub trees have a same parent node in common;
      modifying the equivalent tree diagram; and
   D) using the equivalent tree diagram editing unit for modifying the flowchart according to the modified equivalent tree diagram.

2. The method of claim 1, wherein the editing step (B) further comprises a step of:
   determining that the editing is invalid when:
      the selected at least one node does not correspond to a sub tree in the equivalent tree diagram; and
      the selected at least one node does not correspond to any sub trees in the equivalent tree diagram, wherein and said any sub trees share a same parent node.

3. The method of claim 1 wherein the step of traversing the flowchart is performed in a depth-first manner.

4. The method of claim 1 wherein the step of traversing the flowchart is performed in a width-first manner.

5. The method of claim 1 wherein the step of modifying the flowchart comprises steps of:
   initializing a modified flowchart to comprise a begin node and an end node;
   setting a position between the begin and end nodes as a current position in the modified flowchart;
   setting the root node of the modified equivalent tree diagram as a current node in the modified flowchart;
   performing iteratively, while traversing the modified equivalent tree diagram, beginning with the current node until the current node equals a null node:
      fetching a next node in the equivalent tree diagram as the current node in depth first traversal;
      performing iteratively until the current node is not a leaf node:
         inserting a processing activity node corresponding to the current node into the current position; and
         moving the current position to a next insert position in that logic structure;
      generating a corresponding logic structure according to the execution type of the current node;
      inserting the logic structure into the current position;
      moving the current position to the first insert position in said logic structure.

* * * * *

UNITED STATES PATENT AND TRADEMARK OFFICE
CERTIFICATE OF CORRECTION

| | | |
|---|---|---|
| PATENT NO. | : 7,647,577 B2 | Page 1 of 1 |
| APPLICATION NO. | : 11/140194 | |
| DATED | : January 12, 2010 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1114 days.

Signed and Sealed this

Sixteenth Day of November, 2010

David J. Kappos
*Director of the United States Patent and Trademark Office*